(12) United States Patent
Gou et al.

(10) Patent No.: US 12,514,562 B2
(45) Date of Patent: Jan. 6, 2026

(54) ULTRASOUND DIAGNOSTIC APPARATUS, MEDICAL IMAGE PROCESSING APPARATUS, AND MEDICAL IMAGE PROCESSING METHOD

(71) Applicant: CANON MEDICAL SYSTEMS CORPORATION, Tochigi (JP)

(72) Inventors: Panjie Gou, Beijing (CN); Shun Zhao, Beijing (CN); Lingling Zhao, Beijing (CN); Qilin Xiao, Beijing (CN)

(73) Assignee: CANON MEDICAL SYSTEMS CORPORATION, Tochigi (JP)

(*) Notice: Subject to any disclaimer, the term of this patent is extended or adjusted under 35 U.S.C. 154(b) by 944 days.

(21) Appl. No.: 17/716,453

(22) Filed: Apr. 8, 2022

(65) Prior Publication Data

US 2022/0240898 A1    Aug. 4, 2022

Related U.S. Application Data

(63) Continuation of application No. PCT/JP2021/017844, filed on May 11, 2021.

(30) Foreign Application Priority Data

May 13, 2020 (CN) .......................... 202010402012.2
Jul. 30, 2020 (CN) .......................... 202010748328.7
May 10, 2021 (JP) ................................. 2021-079580

(51) Int. Cl.
*A61B 8/00* (2006.01)
*G06T 3/14* (2024.01)
*G06T 7/00* (2017.01)

(52) U.S. Cl.
CPC ............ *A61B 8/5215* (2013.01); *A61B 8/461* (2013.01); *A61B 8/488* (2013.01); *G06T 3/14* (2024.01);

(Continued)

(58) Field of Classification Search
CPC ....... A61B 8/5215; A61B 8/461; A61B 8/488; A61B 8/5223; A61B 6/032; A61B 6/037;
(Continued)

(56) References Cited

U.S. PATENT DOCUMENTS 10,186,035 B2 * 1/2019 Choi ........................ G06T 7/74
11,419,583 B2   8/2022 Kruecker et al.
(Continued)

FOREIGN PATENT DOCUMENTS

CN     102224525 A    10/2011
CN     106456253 A     2/2017
(Continued)

OTHER PUBLICATIONS

Combined Chinese Office Action and Search Report issued Jun. 29, 2023, in corresponding Chinese Patent Application No. 202010402012.2 (with English Translation of Category of Cited Documents), 9 pages.

(Continued)

*Primary Examiner* — Kent Yip
(74) *Attorney, Agent, or Firm* — Oblon, McClelland, Maier & Neustadt, L.L.P.

(57) ABSTRACT

An ultrasound diagnostic apparatus according to an embodiment includes processing circuitry. The processing circuitry derives a predefined image evaluation parameter with respect to a plurality of two-dimensional ultrasound images obtained by an ultrasound probe. Based on the derivation results of the image evaluation parameter, the processing circuitry selects a two-dimensional ultrasound image for registration purpose from among the plurality of two-dimensional ultrasound images. The processing circuitry performs image registration of a three-dimensional medical image and the two-dimensional medical image for registration purpose.

21 Claims, 14 Drawing Sheets

(52) U.S. Cl.
CPC .............. *G06T 7/0012* (2013.01); *G06T 7/97* (2017.01); *G06T 2207/10132* (2013.01)

(58) Field of Classification Search
CPC ....... A61B 8/06; A61B 8/4254; A61B 8/5261; A61B 8/44; A61B 8/4444; A61B 8/466; A61B 8/483; G06T 3/14; G06T 7/0012; G06T 7/97; G06T 2207/10132; G06T 7/337; G06T 2207/30004
See application file for complete search history.

(56) References Cited

U.S. PATENT DOCUMENTS

| | | | |
|---|---|---|---|
| 11,963,826 B2 | 4/2024 | Kruecker et al. | |
| 2011/0235890 A1 | 9/2011 | Ruijters | |
| 2014/0193053 A1* | 7/2014 | Kadoury | A61B 90/36 382/128 |
| 2017/0079623 A1* | 3/2017 | Kruecker | A61B 8/5261 |
| 2019/0015076 A1 | 1/2019 | Rouet et al. | |
| 2020/0107884 A1 | 4/2020 | Razeto et al. | |
| 2020/0273184 A1 | 8/2020 | Dufour et al. | |
| 2022/0346757 A1 | 11/2022 | Kruecker et al. | |

FOREIGN PATENT DOCUMENTS

| | | |
|---|---|---|
| DE | 10 2006 056 679 A1 | 6/2008 |
| JP | 2017-202125 A | 11/2017 |
| JP | 2018-538086 A | 12/2018 |
| JP | 2019-503748 A | 2/2019 |
| JP | 2019-115487 A | 7/2019 |
| JP | 2020-54794 A | 4/2020 |

OTHER PUBLICATIONS

Combined Chinese Office Action and Search Report issued Jul. 3, 2023, in corresponding Chinese Patent Application No. 202180002022.X (with English Translation of Category of Cited Documents), 8 pages.

International Search Report issued Jun. 22, 2021 in PCT/JP2021/017844 filed May 11, 2021, 2 pages.

Chinese Decision of Refusal issued Apr. 30, 2025, in corresponding Chinese Patent Application No. 202010748328.7, 4 pages.

Combined Chinese Office Action and Search Report issued on Dec. 23, 2024 in Chinese Patent Application No. 202010748328.7, 7 pages.

* cited by examiner

FIG.7B
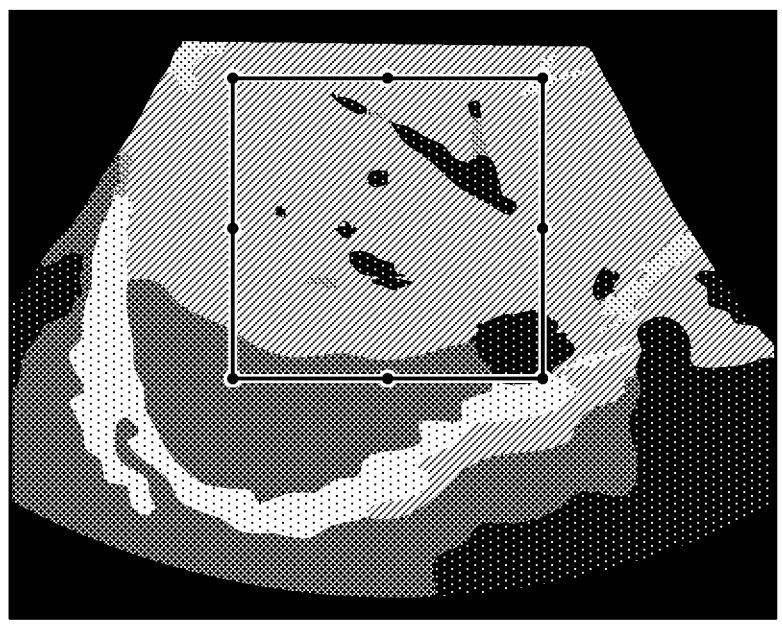
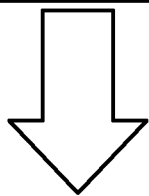
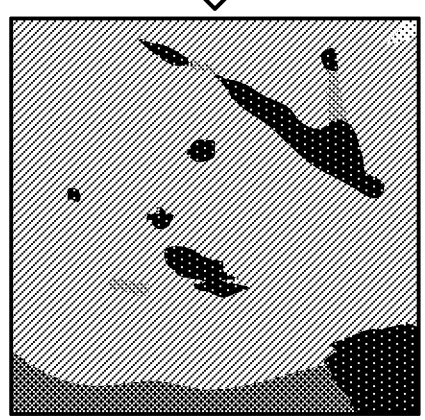

FIG.10
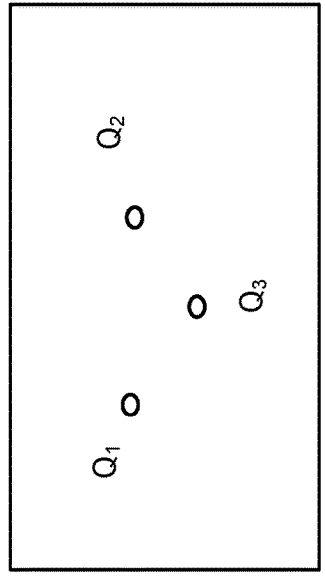
LANDMARKS IN 3D MEDICAL IMAGE
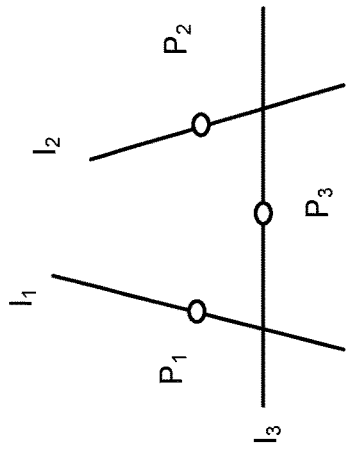
LANDMARKS IN 2D ULTRASOUND IMAGE
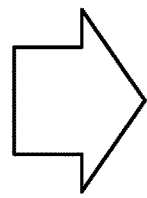
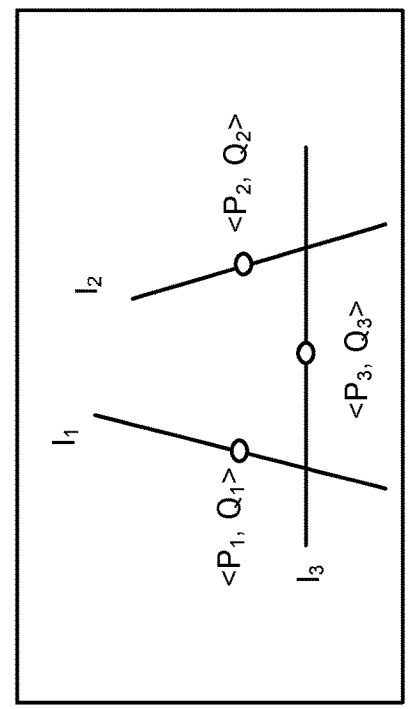

ULTRASOUND DIAGNOSTIC APPARATUS, MEDICAL IMAGE PROCESSING APPARATUS, AND MEDICAL IMAGE PROCESSING METHOD

CROSS-REFERENCE TO RELATED APPLICATIONS

This application is a continuation of PCT international application Ser. No. PCT/JP2021/017844 filed on May 11, 2021 which designates the United States, incorporated herein by reference, and which claims the benefit of priority from Chinese Patent Applications No. 202010402012.2, filed on May 13, 2020, Chinese Patent Applications No. 202010748328.7, filed on Jul. 30, 2020, and Japanese Patent Applications No. 2021-079580, filed on May 10, 2021, incorporated herein by reference.

FIELD

Embodiments described herein relate generally to an ultrasound diagnostic apparatus, a medical image processing apparatus, and a medical image processing method.

BACKGROUND

In the medical field, an ultrasound diagnostic apparatus is used as a medical image diagnostic device that visualizes the inside of the subject using the ultrasound waves generated in a plurality of transducers (piezoelectric transducers) of an ultrasound probe. The ultrasound diagnostic apparatus transmits ultrasound waves coming from the ultrasound probe, which is connected to the ultrasound diagnostic apparatus, to the inside of the subject; generates echo signals based on the reflected waves; and obtains desired ultrasound images by performing image processing.

For example, in order to determine the lesion and its size, it is necessary to understand the spatial structure of the inside of the subject. In that case, three-dimensional (3D) medical images are used that are obtained using a medical image diagnostic device, which is different than the above-mentioned ultrasound diagnostic apparatus. Examples of 3D medical images include 3D ultrasound images obtained in an ultrasound diagnostic apparatus, and 3D images obtained from other medical imaging devices such as an X-ray CT device (CT stands for Computed Tomography) or an MRI device (MRI stands for Magnetic Resonance Imaging).

For example, 3D medical images are generated in advance in the diagnostic stage before undertaking a surgery. However, during a surgery, due to the shift in the body posture, sometimes the volume data in 3D medical images has variability with respect to the actual internal structure; because of which the internal structure of the subject cannot be illustrated in an accurate manner. Hence, during the surgery, three is a demand for being able to take images of the region of surgery, such as the lesion, in real time using a non-invasive ultrasound diagnostic apparatus. As compared to an X-ray CT device or an MRI device, in the case of using an ultrasound diagnostic apparatus, image registration can be performed in the shortest possible period of time without having any restriction on the place and the subject condition. That enables achieving reduction in the physical stress exerted on the subject who has, for example, the abdomen cut open.

In order to perform image registration in the shortest possible period of time, the solution is to select, in the shortest possible period of time, the ultrasound images that make the registration easier. For example, when the operator sets an observable mark in ultrasound images and 3D medical images and performs position adjustment; the operation is complex and time-consuming, because of which a substantial amount of physical stress is exerted on the subject having the abdomen cut open. In that regard, if image registration is performed using only a single ultrasound image, then there is a possibility that the image registration result is not ideal. On the other hand, if image registration is performed using a plurality of ultrasound images, then it requires a long period of time until the ideal image registration result is obtained. Hence, it is desirable that the ultrasound images that make image registration easier can be retrieved in the shortest possible period of time.

BRIEF DESCRIPTION OF THE DRAWINGS

FIGS. 7A and 7B are diagrams illustrating 2D ultrasound images having different texture structures;

FIG. 10 is a diagram illustrating a specific example of image registration, and is meant for explaining the image registration performed using landmarks;

DETAILED DESCRIPTION

An ultrasound diagnostic apparatus according to an embodiment includes processing circuitry. The processing circuitry derives a predefined image evaluation parameter with respect to a plurality of two-dimensional ultrasound images obtained by an ultrasound probe. Based on the derivation results of the image evaluation parameter, the processing circuitry selects a two-dimensional ultrasound image for registration purpose from among the plurality of two-dimensional ultrasound images. The processing circuitry performs image registration of a three-dimensional medical image and the two-dimensional medical image for registration purpose.

An exemplary embodiment of an ultrasound diagnostic apparatus, a medical image processing apparatus, and a medical image processing method is described below in detail with reference to the accompanying drawings. The embodiment described below is only exemplary, and is not the only possible embodiment. Meanwhile, the contents of one embodiment can be applied in other embodiments in principle.

Figure 1:
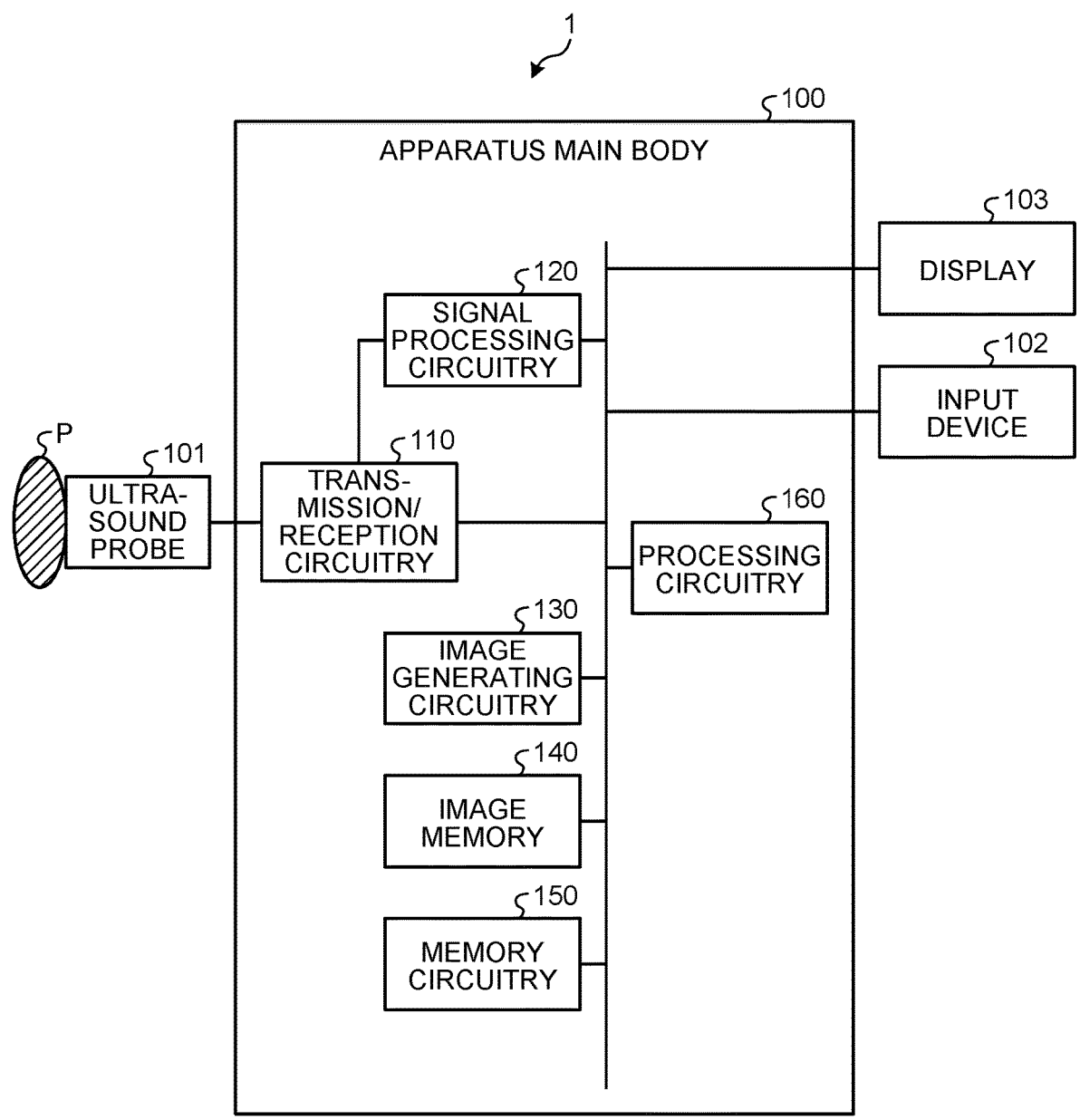
FIG. 1 is a block diagram illustrating an exemplary configuration of an ultrasound diagnostic apparatus according to an embodiment.

FIG. 1 is a block diagram illustrating an exemplary configuration of an ultrasound diagnostic apparatus 1 according to the embodiment. As illustrated in FIG. 1, the ultrasound diagnostic apparatus 1 according to the embodiment includes an apparatus main body 100, an ultrasound probe 101, an input device 102, and a display 103. The ultrasound probe 101, the input device 102, and the display 103 are connected to the apparatus main body 100.

The ultrasound probe 101 includes a plurality of transducers (for example, piezoelectric transducers) that generates ultrasound waves based on drive signals supplied from transmission/reception circuitry 110 installed in the apparatus main body 100 (explained later). Moreover, the transducers in the ultrasound probe 101 receive the reflected waves from a subject P and convert them into electrical signals. The ultrasound probe 101 further includes a matching layer that is provided in the transducers, and a backing material that prevents propagation of ultrasound waves from the transducers toward the posterior side. Moreover, the ultrasound probe 101 has a magnetic sensor attached thereto for the purpose of obtaining the position information of the ultrasound probe 101.

The input device 102 includes an input device that is operable by the operator, and includes an input circuit that receives input of the signals coming from the input device. The input device is implemented using, for example, a tracking ball; a switch; a mouse; a keyboard; a touch-sensitive panel used to perform input operations by touching the operation surface; a touchscreen in which a display screen and a touch-sensitive panel are configured in an integrated manner; a contactless input device in which an optical sensor is used; or a voice input device. When the input device is operated by the operator, the input circuit generates signals corresponding to that operation and outputs the signals to processing circuitry.

The display 103 is configured using a commonly-used display output device such as a liquid crystal display or an OLED display (OLED stands for Organic Light Emitting Diode). The display 103 is used: to display a graphical user interface (GUI) meant for enabling the operator of the ultrasound diagnostic apparatus 1 to input various setting requests using the input device 102; and to display ultrasound image data generated in the apparatus main body 100. The display 103 represents an example of a display unit.

The apparatus main body 100 generates ultrasound image data based on the reflected-wave signals received by the ultrasound probe 101. As illustrated in FIG. 1, the apparatus main body 100 includes the transmission/reception circuitry 110, signal processing circuitry 120, image generating circuitry 130, an image memory 140, memory circuitry 150, and processing circuitry 160. The transmission/reception circuitry 110, the signal processing circuitry 120, the image generating circuitry 130, the image memory 140, the memory circuitry 150, and the processing circuitry 160 are connected to each other in a communicable manner.

The transmission/reception circuitry 110 controls the transmission of ultrasound waves from the ultrasound probe 101. For example, based on an instruction from the processing circuitry 160, the transmission/reception circuitry 110 applies the abovementioned drive signals (drive pulses) to the ultrasound probe 101 at a timing having a predetermined transmission delay period assigned on a transducer-by-transducer basis. As a result, the transmission/reception circuitry 110 makes the ultrasound probe 101 transmit an ultrasound beam in which ultrasound waves are focused in a beam-like manner. Moreover, the transmission/reception circuitry 110 controls the reception of reflected-wave signals in the ultrasound probe 101. As explained earlier, the reflected-wave signals are the signals obtained when the ultrasound waves transmitted from the ultrasound probe 101 are reflected from the body tissues of the subject P. For example, based on an instruction from the processing circuitry 160, the transmission/reception circuitry 110 assigns a predetermined delay period to the reflected-wave signals received in the ultrasound probe 101 and performs an addition operation. As a result, the reflection component gets highlighted from the direction corresponding to the reception directionality of the reflected-wave signals.

The signal processing circuitry 120 performs a variety of signal processing with respect to the reflected-wave signals received by the transmission/reception circuitry 110. For example, the signal processing circuitry 120 performs a variety of signal processing with respect to the reflected-wave signals and generates data (B-mode data) in which the signal intensity at each sample point (observation point) is expressed in terms of the level of luminosity. Moreover, the signal processing circuitry 120 generates data (Doppler data) in which the kinetic information based on the Doppler effect of a moving body is extracted at each sample point in the scanning region.

The image generating circuitry 130 generates image data (ultrasound images) from the data that has been subjected to a variety of signal processing by the signal processing circuitry 120, and performs a variety of image processing with respect to the ultrasound images. For example, from two-dimensional (2D) B-mode data, the image generating circuitry 130 generates 2D ultrasound images in which the intensity of the reflected waves is expressed in terms of luminosity. Moreover, from two-dimensional Doppler data, the image generating circuitry 130 generates 2D ultrasound images in which the blood flow information is visualized.

The image generating circuitry 130 performs coordinate conversion according to the state of ultrasound wave scanning performed by the ultrasound probe 101, and generates an ultrasound image for display. For example, the B-mode data and the Doppler data represent pre-scanning-conversion ultrasound image data, and the data generated by the image generating circuitry 130 represents ultrasound image data for display that is obtained after performing scanning conversion. That is, the image generating circuitry 130 generates 2D ultrasound image data for display from the pre-scanning-conversion 2D ultrasound image data. Moreover, the image generating circuitry 130 performs coordinate conversion with respect to the three-dimensional (3D) B-mode data generated by the signal processing circuitry 120, and generates a 3D ultrasound image. Furthermore, the image generating circuitry 130 performs coordinate conversion with respect to the three-dimensional Doppler data generated by the signal processing circuitry 120, and generates a 3D ultrasound image. Furthermore, in order to generate various 2D ultrasound images meant for displaying volume image data in the display 103, the image generating circuitry 130 performs rendering with respect to the volume image data.

The image generating circuitry 130 stores, in the image memory 140, ultrasound images as well as ultrasound images that have been subjected to a variety of image processing. The image memory 140 as well as the memory circuitry 150 is a semiconductor memory device such as a random access memory (ROA) or a flash memory, or is a memory device such as a hard disc or an optical disc.

The processing circuitry 160 controls the overall operations of the ultrasound diagnostic apparatus 1. More particularly, based on various setting requests input by the operator via the input device 102 and based on various control programs and a variety of data read from the memory circuitry 150; the processing circuitry 160 controls the operations of the transmission/reception circuitry 110, the signal processing circuitry 120, the image generating circuitry 130, and the image memory 140. The processing circuitry 160 performs control to display, in the display 103, the ultrasound images for display generated by the image generating circuitry 130, or the ultrasound images for display stored in image memory 140.

Figure 2:
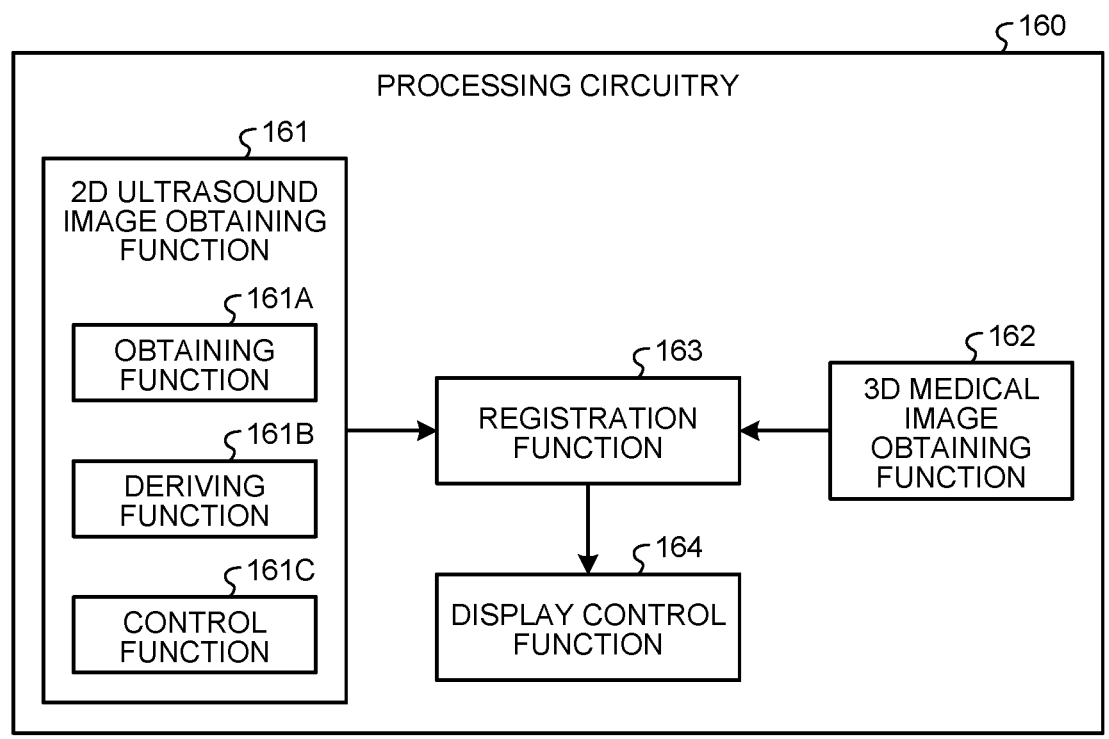
FIG. 2 is a block diagram illustrating a configuration of processing circuitry of the ultrasound diagnostic apparatus according to the embodiment.

The processing circuitry 160 functions as a medical image processing apparatus according to the embodiment. FIG. 2 is a block diagram illustrating a configuration of the processing circuitry 160. As illustrated in FIG. 2, the processing circuitry 160 executes a 2D ultrasound image obtaining function 161 for obtaining 2D ultrasound images for registration purpose; a 3D medical image obtaining function 162; a registration function 163; and a display control function 164. The 2D ultrasound image obtaining function 161 includes an obtaining function 161A, a deriving function 161B, and a control function 161C. The deriving function 161B represents an example of a deriving unit. The control function 161C represents an example of a control unit. The registration function 163 represents an example of a registration unit.

The processing functions implemented by the 2D ultrasound image obtaining function 161, the 3D medical image obtaining function 162, the registration function 163, and the display control function 164, which are the constituent elements of the processing circuitry 160 illustrated in FIG. 2, are recorded as, for example, computer-executable programs in the memory circuitry 150 of the ultrasound diagnostic apparatus 1. The processing circuitry 160 is a processor that reads the computer programs from the memory circuitry 150 and executes them so as to implement the corresponding processing functions. In other words, as a result of reading the computer programs, the processing circuitry 160 gets equipped with the functions illustrated in FIG. 2. Meanwhile, regarding the operation details of the 2D ultrasound image obtaining function 161, the 3D medical image obtaining function 162, the registration function 163, and the display control function 164 that are executed by the processing circuitry 160; the explanation is given later.

With reference to FIG. 2, the explanation is given about the case in which the processing functions corresponding to the 2D ultrasound image obtaining function 161, the 3D medical image obtaining function 162, the registration function 163, and the display control function 164 are implemented in a single processing circuitry 160. However, alternatively, processing circuitry can be configured by combining a plurality of independent processors, and each processor can execute computer programs for implementing functions.

The term "processor" used above implies, for example, a central processing unit (CPU), a graphics processing unit (GPU), an application specific integrated circuit (ASIC), a programmable logic device (for example, a simple programmable logic device (SPLD), a complex programmable logic device (CPLD), or a field programmable gate array (FPGA)). When the processor is a CPU, it reads the computer programs stored in the memory circuitry 150 and executes them to implement the functions. When the processor is, for example, an ASIC, instead of storing the computer programs in the memory circuitry 150, they are directly embedded in the circuitry of the processor. Meanwhile, a processor according to the embodiment is not limited to be configured as a singular circuit. Alternatively, a plurality of independent circuits can be combined to configure a single processor that implements the functions. Alternatively, the constituent elements illustrated in FIG. 2 can be integrated into a single processor, and their functions can be implemented in the processor.

Till now, the explanation was given about an overall configuration of the ultrasound diagnostic apparatus 1 according to the embodiment. With such a configuration, in the ultrasound diagnostic apparatus 1 according to the embodiment, the following operations are performed so as to enable retrieving ultrasound images that make it easy to perform image registration. In the in the ultrasound diagnostic apparatus 1 according to the embodiment, with respect to a plurality of 2D ultrasound images obtained by the ultrasound probe 101, the deriving function 161B derives a predefined image evaluation parameter. Based on the derivation results of the image evaluation parameter, the control function 161C selects a 2D ultrasound image for registration purpose from among a plurality of 2D ultrasound images. Then, the registration function 163 performs image registration of a 3D medical image and the 2D ultrasound image for registration purpose.

Given below is the explanation about the processing functions of the processing circuitry 160 illustrated in FIG. 2.

Firstly, the explanation is given about the 2D ultrasound image obtaining function 161. The 2D ultrasound image obtaining function 161 selects a 2D ultrasound image for registration purpose from a plurality of 2D ultrasound images generated by the image generating circuitry 130. As explained above, the 2D ultrasound image obtaining function 161 includes the obtaining function 161A, the deriving function 161B, and the control function 161C.

The obtaining function 161A obtains, from the image generating circuitry 130, a plurality of 2D ultrasound images as ultrasound images of the subject P obtained when ultrasound scanning is performed with respect to the subject P. The obtaining function 161A unselectively obtains all 2D ultrasound images from the image generating circuitry 130.

The deriving function 161B derives an image evaluation parameter with respect to all 2D ultrasound images, which are obtained by the obtaining function 161A, based on a predefined image evaluation parameter and based on a derivation method for deriving an image evaluation parameter. Moreover, according to a threshold value range corresponding to the image evaluation parameter, the deriving function 161B determines the relationship of the derivation result of the image evaluation parameter for each 2D ultrasound image with the threshold value range.

The image evaluation parameter is an index for evaluating whether or not a 2D ultrasound image is favorable for performing accurate image registration. In the embodiment, for example, the image evaluation parameter can be at least either one of a landmark, a texture metric, an orthogonality metric, coverage (or multiplicity), and a Doppler blood flow image. Such image evaluation parameters are only exemplary, and are not the only possible parameters. Regarding the derivation method for deriving each image evaluation parameter, the explanation is given later.

The control function 161C displays, in the display 103, the derivation results of the image evaluation parameter derived by the deriving function 161B, and thus presents the derivation results to the operator. For example, the control function 161C displays, in the display 103, the derivation results of the image evaluation parameter along with the 2D ultrasound images. More particularly, the control function 161C writes the derivation results in the 2D ultrasound images, and displays the 2D ultrasound images in the display 103.

Meanwhile, based on the derivation results and based on a predetermined threshold value range meant for evaluating the degrees of recommendation, the control function 161C displays different derivation results on the 2D ultrasound images in different forms according to the degrees of recommendation. Herein, the control function 161C can display, on the 2D ultrasound images, the derivation results in different colors according to the degrees of recommendation. Alternatively, according to the degrees of recommendation, the control function 161C can display, in a highlighted manner, the 2D ultrasound images having the derivation results exceeding a predetermined threshold value as the suitable 2D ultrasound images. With that, by referring to the derivation results displayed in the display 103 and the 2D ultrasound images displayed in a highlighted manner, the operator can confirm the 2D ultrasound image for registration purpose.

Herein, the 2D ultrasound image for registration purpose can be manually selected by the operator (using, for example, the input device 102), or can be automatically selected by the control function 161C. For example, when the control function 161C displays the derivation results on the 2D ultraviolet images in different colors according to the degrees of recommendation, the operator uses the input device 102 and selects the 2D ultrasound image having the highest degree of recommendation as the 2D ultrasound image for registration purpose. Alternatively, the control function 161C automatically selects, as the suitable 2D ultrasound images, the 2D ultrasound images for which the derivation result exceeds a predetermined threshold value; and displays those 2D ultrasound images in a highlighted manner in the display 103. Then, the control function 161C outputs the selected 2D ultrasound images for registration purpose to the registration function 163.

The 3D medical image obtaining function 162 obtains a 3D medical image generated by a medical image diagnostic device, and outputs it to the registration function 163. Examples of a medical image diagnostic device include an ultrasound diagnostic apparatus, an X-ray CT device (CT stands for Computer Tomography), an MRI device (MRI stands for Magnetic Resonance Imaging), a SPECT (SPECT stands for Single Photon Emission Computed Tomography), a PET device (PET stands for Positron Emission Computed Tomography), a SPECT-CT device in which a SPECT device and an X-ray CT device are integrated, and a PET-CT device in which a PET device and an X-ray CT device are integrated. A 3D medical image is, for example, either a 3D ultrasound image, or a 3D computer tomography image, or a 3D magnetic resonance image.

The registration function 163 performs image registration of the 2D ultrasound image for registration purpose, which is output from the control function 161C of the 2D ultrasound image obtaining function 161, and the 3D medical image, which is output from the 3D medical image obtaining function 162. That is, the registration function 163 performs image registration as position adjustment of the 2D ultrasound image for registration purpose and the 3D medical image.

The display control function 164 displays, in the display 103, the image registration result obtained by the registration function 163. That is, the display control function 164 displays, in the display 103, the image formed as a result of image registration of the 2D ultrasound image for registration purpose and the 3D medical image.

In this way, in the ultrasound diagnostic apparatus 1 according to the embodiment, when the 2D ultrasound image obtaining function 161 obtains a plurality of 2D ultrasound images, the deriving function 161B of the 2D ultrasound image obtaining function 161 derives the image evaluation parameter for those 2D ultrasound images, which are obtained by the obtaining function 161A, based on a predefined image evaluation parameter. Subsequently, based on the derivation results of the image evaluation parameter, from among the 2D ultrasound images, the control function 161C selects suitable 2D ultrasound images as the 2D ultrasound images for registration purpose. Thus, the 2D ultrasound images that make image registration easier can be retrieved in a short period of time. Hence, in the ultrasound diagnostic apparatus 1 according to the embodiment, using the registration function 163, it becomes possible to perform image registration of the 2D ultrasound images for registration purpose and a 3D medical image, which is obtained by the 3D medical image obtaining function 162, in a short period of time and in an accurate manner.

Given below is the detailed explanation of the operations performed by the deriving function 161B and the control function 161C of the 2D ultrasound image obtaining function 161.

Firstly, the operator sets in advance a plurality of numerical ranges for the purpose of evaluating the degrees of recommendation for each image evaluation parameter. For example, the deriving function 161B of the 2D ultrasound image obtaining function 161 derives the image evaluation parameter for the 2D ultrasound images obtained by the obtaining function 161A, obtains the derivation results of the image evaluation parameter, and determines the numerical ranges of the derivation results. With that, the degrees of recommendation of the 2D ultrasound images can be obtained. Meanwhile, the derivation results are represented by normalized numerical values that are normalized in the interval of [0, 1]. Then, the control function 161C displays, in the display 103, the 2D ultrasound images in which the normalized numerical values are included. For example, as the normalized numerical values, the derivation results can be divided into three intervals, namely, "0 to 0.6", "0.6 to 0.85", and "0.85 to 1". Herein, the interval "0.85 to 1" represents the interval having the highest degree of recommendation, and the interval "0 to 0.6" represents the interval having the lowest degree of recommendation.

For example, the normalized numerical values are illustrated with interval-based colors assigned thereto. Then, the control function 161C displays the derivation results in color in the display 103. More particularly, the three intervals "0 to 0.6", "0.6 to 0.85", and "0.85 to 1" are assigned with the red color, the yellow color, and the green color, respectively. In that case, the green color corresponds to the highest degree of recommendation, and the red color corresponds to the lowest degree of recommendation. For example, when a derivation result in the form of a normalized numerical value is in the interval "0 to 0.6", the control function 161C displays that normalized numerical value in red on the 2D ultrasound image as the information indicating that the concerned 2D ultrasound image is not suitable for image registration with a 3D medical image. Moreover, for example, when a derivation result in the form of a normalized numerical value is in the interval "0.6 to 0.85", the control function 161C displays the normalized numerical value in yellow on the 2D ultrasound image as the information indicating that the concerned 2D ultrasound image has a standard quality and can be used for image registration with a 3D medical image. Furthermore, for example, when a derivation result in the form of a normalized numerical value is in the interval "0.85 to 1", the control function 161C displays the normalized numerical value in green on the 2D ultrasound image as the information indicating that the concerned 2D ultrasound image has excellent quality and is suitable for image registration with a 3D medical image.

Figure 3A:
FIGS. 3A to 3C are diagrams illustrating display examples of 2D ultrasound images.
Figure 3B:
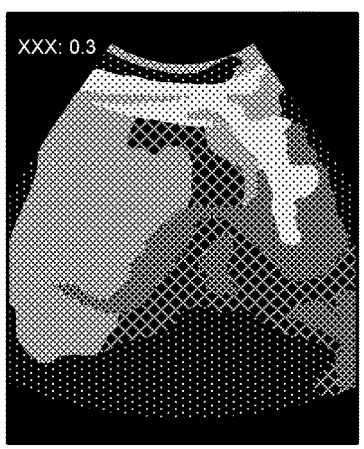
Figure 3C:

FIGS. 3A to 3C are schematic diagrams in which the control function 161C displays, as display examples of 2D ultrasound images in the display 103, three 2D ultrasound images along with the respective derivation results in the form of normalized numerical values.

For example, in FIG. 3A, information "XXX: 0.95" that is displayed in the top left portion of the 2D ultrasound image is written in green color. In FIG. 3B, information "XXX: 0.3" that is displayed in the top left portion of the 2D ultrasound image is written in red color. In FIG. 3C, information "XXX: 0.7" that is displayed in the top left portion of the 2D ultrasound image is written in yellow color. In FIGS. 3A to 3C, the information "XXX" represents the name of the selected image evaluation parameter; and "0.95", "0.3", and "0.7" represent the derivation results in the form of normalized numerical values. In FIGS. 3A to 3C, the red, yellow, and green colors in which the information is displayed in the top left portion of the 2D ultrasound images are identified based on three intervals, namely, "0 to 0.6", "0.6 to 0.85", and "0.85 to 1", respectively. As a result, according to the colors displayed on the 2D ultrasound images, the operator can easily get to know the suitable ultrasound image.

Meanwhile, if only the normalized numerical values "0.95", "0.3", and "0.7" representing the derivation results are displayed in the display 103, and if the operator selects one of those numerical values; then the control function 161C can treat the 2D ultrasound image corresponding to the selected numerical value as the 2D ultrasound image for registration purpose. For example, if the operator selects the numerical value "0.95", then the control function 161C treats the 2D ultrasound image corresponding to the numerical value "0.95" as the 2D ultrasound image for registration purpose.

Alternatively, in addition to displaying the information "XXX: 0.95", "XXX: 0.3", and "XXX: 0.7", which contains the normalized numerical values as the derivation results, in the top left portion of three 2D ultrasound images; the control function 161C can also display information indicating whether or not the 2D ultrasound images are suitable for image registration with a 3D medical image. For example, since the numerical value "0.95" in the information "XXX: 0.95" is present within the interval "0.85 to 1"; regarding the information "XXX: 0.95", the control function 161C displays, in the display 103, characters such as information "XXX: 0.9 (suitable)" indicating the suitability for image registration with a 3D medical image.

In the examples given above, the explanation is given about some display methods for displaying the derivation results. However, the embodiment is not limited to those examples. Alternatively, any other method can be implemented as long as it contributes in enabling the operator to differentiate the suitable 2D ultrasound image.

Moreover, in the examples given above, the method is used in which the derivation results are displayed after being normalized within the interval "0, 1". However, it is not always necessary to perform the normalization.

Figure 4:
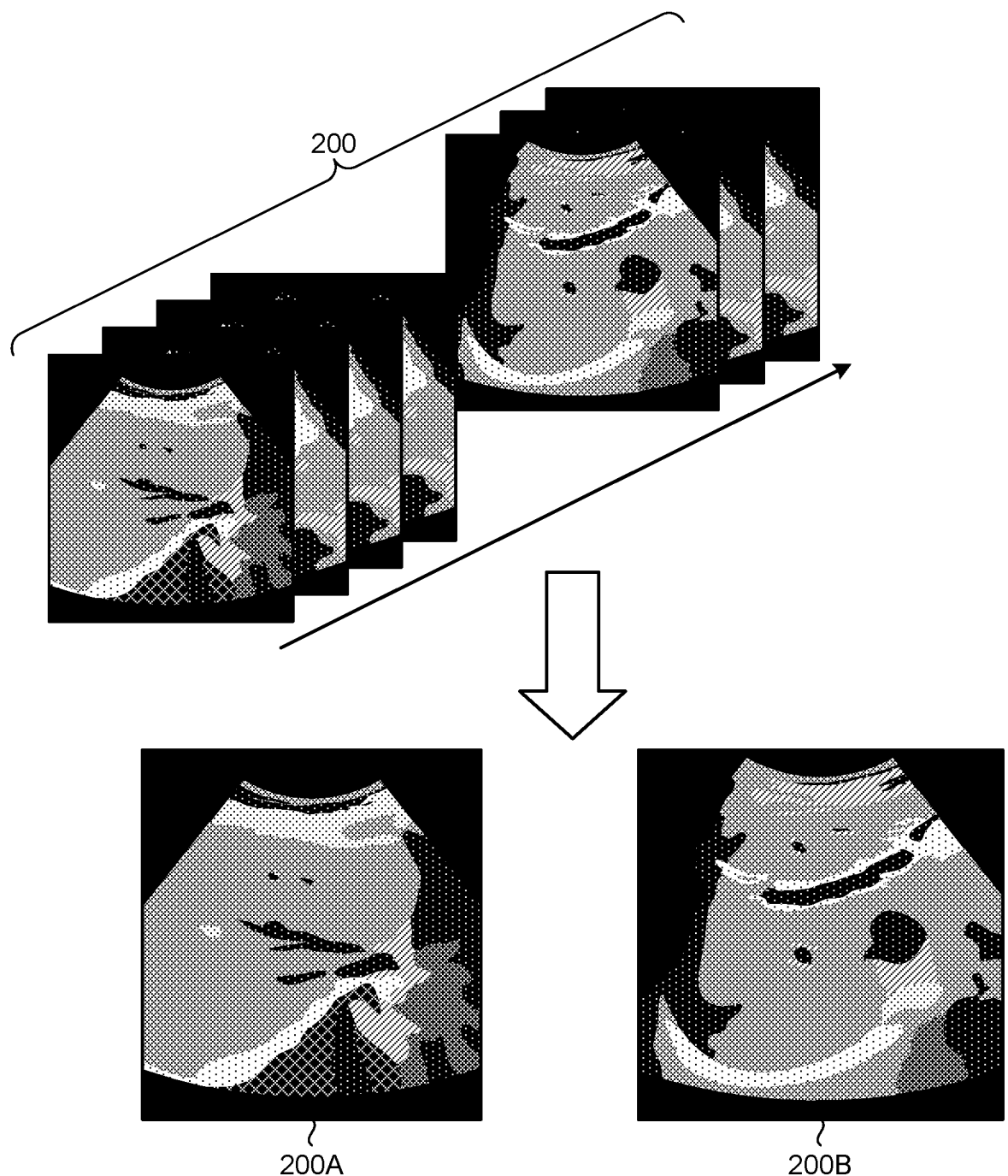
FIG. 4 is a diagram illustrating a display example of 2D ultrasound images.

FIG. 4 is a schematic diagram in which, as a display example of 2D ultrasound images, the suitable 2D ultrasound images are displayed in a highlighted manner in the display 103.

Firstly, with reference to the upper part in FIG. 4, in the real-time scanning performed by the ultrasound probe 101, the deriving function 161B derives the image evaluation parameter for a plurality of 2D ultrasound images 200 obtained by the obtaining function 161A; and, based on the derivation results of the image evaluation parameter, the control function 161C determines whether or not those 2D ultrasound images 200 are suitable for image registration with a 3D medical image. Subsequently, with reference to the lower part in FIG. 4, for example, assume that, from among a plurality of 2D ultrasound images 200, ultrasound images 200A and 200B are the comparatively-suitable 2D ultrasound images. In that case, the control function 161C determines that the 2D ultrasound images 200A and 200B are suitable for image registration with a 3D medical image and displays them in a highlighted manner by, for example, highlighting the edges. For example, in the 2D ultrasound images 200A and 200B, the edges constitute the frames, and the control function 161C displays the frames in a highlighted manner. For example, in the 2D ultrasound images 200A and 200B, the edges represent landmarks, and the control function 161C displays the landmarks in a highlighted manner.

Alternatively, the highlighted display can be performed at the time of image registration of the 2D ultrasound images and a 3D medical image. For example, if the control function 161C determines that, from among a plurality of 2D ultrasound images 200, only the 2D ultrasound image 200A is suitable for image registration with a 3D medical image, then the 2D ultrasound image 200A is displayed in a highlighted manner even when image registration of the 2D ultrasound image 200A and a 3D medical image has been performed. Still alternatively, for example, after the 2D ultrasound images 200A and 200B are displayed in the display 103 and presented to the operator, the control function 161C can treat the operator-selected 2D ultrasound image as the 2D ultrasound image for registration purpose.

The difference in the example illustrated in FIG. 4 and the examples illustrated in FIGS. 3A to 3C is that, in the example illustrated in FIG. 4, the control function 161C does not display a specific derivation result (numerical value) in the display 103; but, based on the derivation result, displays the suitable 2D ultrasound images in a highlighted manner.

Moreover, in the examples illustrated in FIGS. 3A to 3C, the 2D ultrasound images and the respective derivation results are displayed in the display 103 and are presented to the operator. On the other hand, in the example illustrated in FIG. 4, the highlighted 2D ultrasound images are presented to the operator. However, the 2D ultrasound images need not always be displayed to the operator. For example, based on the derivation results of the image evaluation parameter, after determining that one of a plurality of 2D ultrasound images is suitable for image registration with a 3D medical image, instead of presenting that 2D ultrasound image to the operator, the control function 161C performs image registration with a 3D medical image by treating the suitable 2D ultrasound image as the 2D ultrasound image for registration purpose.

Figure 5A:
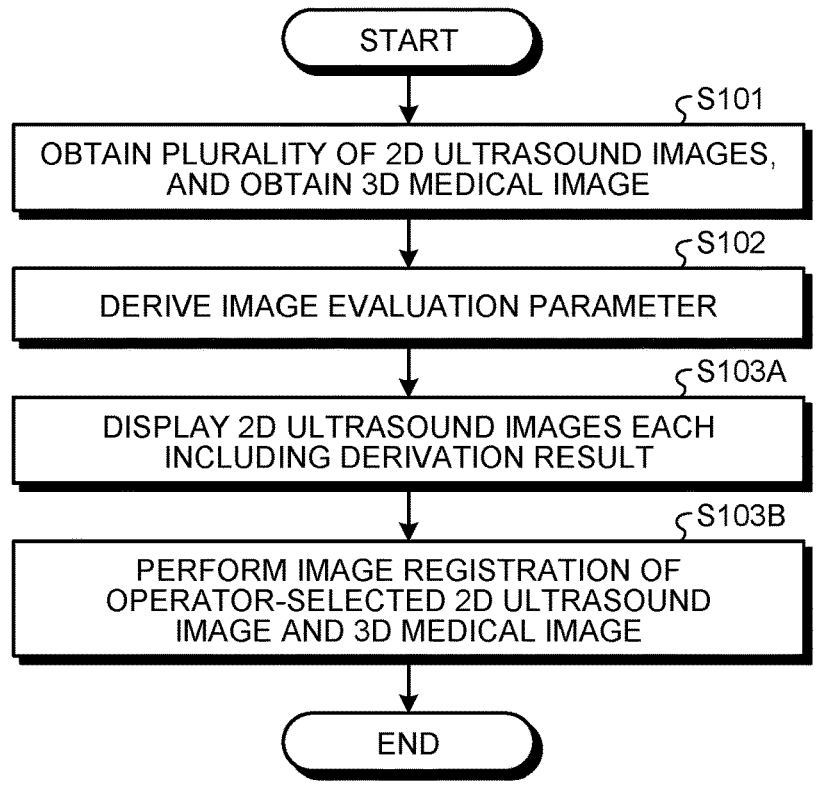
FIGS. 5A to 5C are flowcharts for explaining the operations performed in the ultrasound diagnostic apparatus according to the embodiment.
Figure 5B:
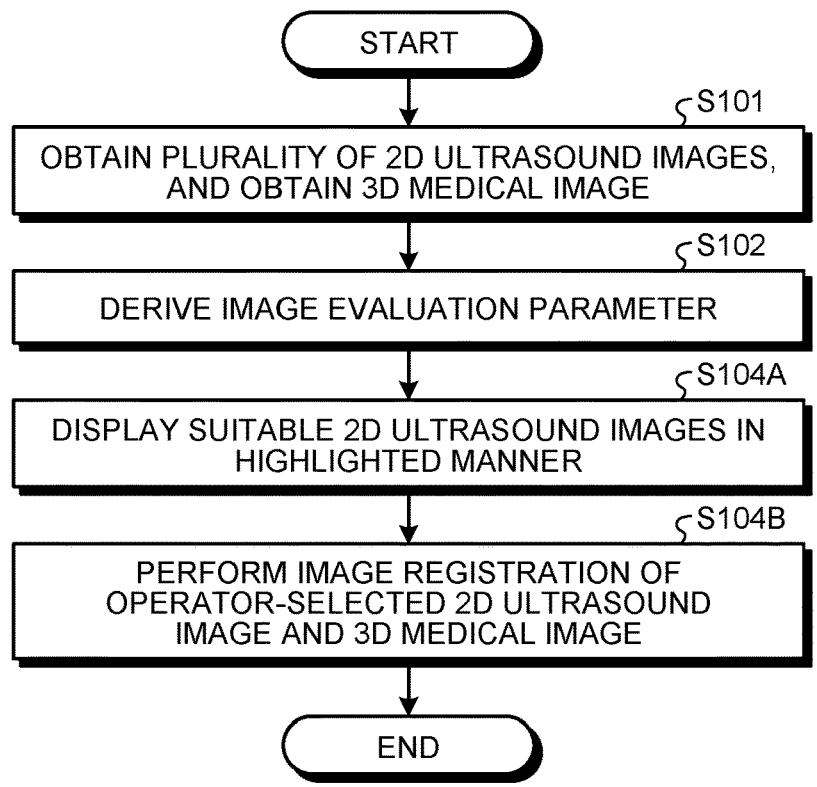
Figure 5C:
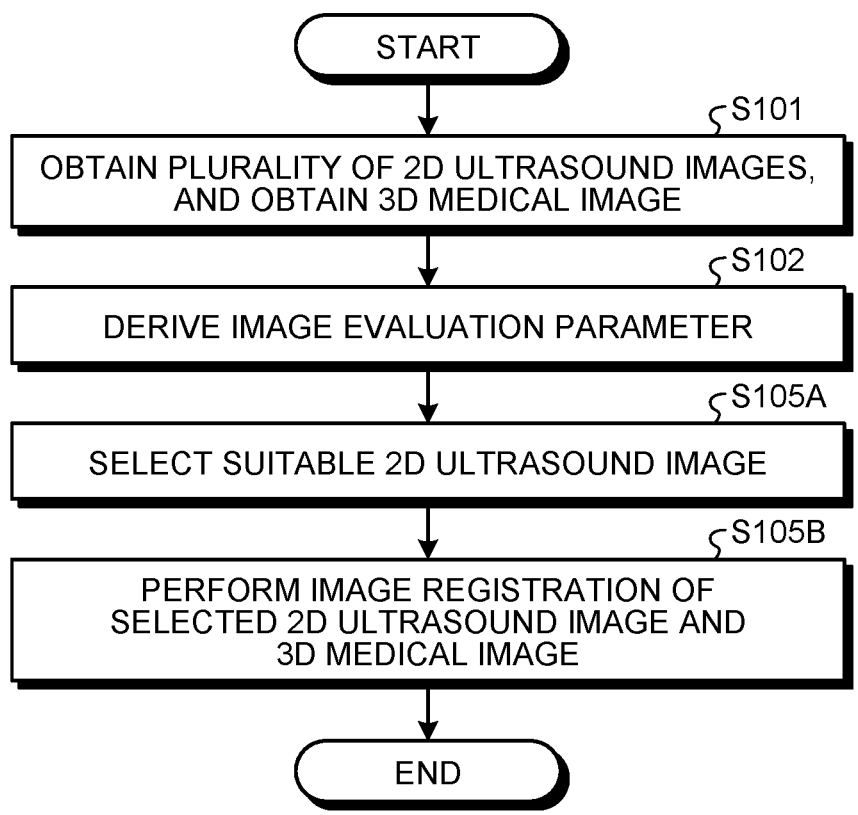

FIGS. 5A to 5C are flowcharts for explaining the selection of the 2D ultrasound image for registration purpose as the operations performed in the medical image processing apparatus according to the embodiment.

FIG. 5A corresponds to the examples illustrated in FIGS. 3A to 3C. In FIG. 5A are illustrated the operations performed in which, after a plurality of 2D ultrasound images and the respective derivation results are displayed in the display 103 and presented to the user, the processing circuitry 160 performs image registration of the operator-selected 2D ultrasound image and a 3D medical image.

Firstly, at Step S101 illustrated in FIG. 5A, the processing circuitry 160 calls computer programs corresponding to the obtaining function 161A and the 3D medical image obtaining function 162 from the memory circuitry 150, and executes those computer programs. At Step S101, the obtaining function 161A of the 2D ultrasound image obtaining function 161 obtains, from the image generating circuitry 130, a plurality of 2D ultrasound images, which is transmitted via the ultrasound probe 101 and processed, as the ultrasound images of the subject P obtained when ultrasound scanning is performed with respect to the subject P. The 3D medical image obtaining function 162 obtains a 3D medical image generated by a medical image diagnostic device.

Then, at Step S102 illustrated in FIG. 5A, the processing circuitry 160 calls the computer program corresponding to the deriving function 161B and executes that computer program. At Step S102, based on the preidentified image evaluation parameter, the deriving function 161B of the 2D ultrasound image obtaining function 161 derives the image evaluation parameter for a plurality of 2D ultrasound images obtained by the obtaining function 161A, and obtains numerical values representing the derivation results.

Subsequently, at Step S103A illustrated in FIG. 5A, the processing circuitry 160 reads the computer program corresponding to the control function 161C and executes that computer program. At Step S103A, the control function 161C displays, in the display 103, a plurality of 2D ultrasound images in each of which the derivation result of the image evaluation parameter is included as a numerical value, and thus presents the 2D ultrasound images to the operator. At that time, the control function 161C treats the operator-selected 2D ultrasound image as the 2D ultrasound image for registration purpose.

Then, at Step S103B illustrated in FIG. 5A, the processing circuitry 160 reads the computer programs corresponding to the registration function 163 and the display control function 164, and executes those computer programs. At Step S103B, the registration function 163 performs image registration of the operator-selected 2D ultrasound image, which is selected by the operator as the 2D ultrasound image for registration purpose, and a 3D medical image obtained by the 3D medical image obtaining function 162. The display control function 164 displays, in the display 103, the resultant image of performing image registration of the 2D ultrasound image for registration purpose and the 3D medical image.

FIG. 5B corresponds to the example illustrated in FIG. 4. In FIG. 5B are illustrated the operations performed in which, after the highlighted 2D ultrasound images are presented to the operator, the processing circuitry 160 performs image registration of the operator-selected 2D ultrasound image and a 3D medical image.

With reference to FIG. 5B, in an identical manner to FIG. 5A, firstly the operations at Steps S101 and S102 are performed. Then, at Step S104A illustrated in FIG. 5B, the processing circuitry 160 reads the computer program corresponding to the control function 161C from the memory circuitry 150, and executes that computer program. At Step S104A, based on the derivation results of the image evaluation parameter, the control function 161C determines whether or not a plurality of 2D ultrasound images is suitable for image registration with a 3D medical image, and displays the comparatively-suitable 2D ultrasound images in a highlighted manner and presents them to the operator. At that time, the control function 161C treats the operator-selected 2D ultrasound image as the 2D ultrasound image for registration purpose.

Then, at Step S104B illustrated in FIG. 5B, the processing circuitry 160 calls the computer programs corresponding to the registration function 163 and the display control function 164, and executes those computer programs. At Step S104B, the registration function 163 performs image registration of the operator-selected 2D ultrasound image, which is selected by the operator as the 2D ultrasound image for registration purpose, and the 3D medical image obtained by the 3D medical image obtaining function 162. The display control function 164 displays, in the display 103, the resultant image of performing image registration of the 2D ultrasound image for registration purpose and the 3D medical image. Herein, even after image registration of the 2D ultrasound image and the 3D medical image is performed; for example, the control function 161C can display the edges of the 2D ultrasound image in a highlighted manner.

In FIG. 5C are illustrated the operations in which, instead of presenting the suitable 2D ultrasound image to the operator, the processing circuitry 160 performs image registration with a 3D medical image by treating the suitable 2D ultrasound image as the 2D ultrasound image for registration purpose.

In FIG. 5C, in an identical manner to FIG. 5A, the operations at Steps S101 and S102 are performed. Then, at Step S105A illustrated in FIG. 5C, the processing circuitry 160 calls the computer program corresponding to the control function 161C from the memory circuitry 150, and executes that computer program. At Step S105A, based on the derivation results of the image evaluation parameter, if it is determined that one of a plurality of 2D ultrasound images is suitable for image registration with a 3D medical image; then, without presenting that suitable 2D ultrasound image to the operator, the control function 161C selects it as the 2D ultrasound image for registration purpose.

Then, at Step S105B illustrated in FIG. 5C, the processing circuitry 160 calls the computer programs corresponding to the registration function 163 and the display control function 164 from the memory circuitry 150, and executes those computer programs. At Step S105B, the registration function 163 performs image registration of the 2D ultrasound image selected by the control function 161C and the 3D medical image obtained by the 3D medical image obtaining function 162. The display control function 164 displays, in the display 103, the resultant image of performing image registration of the 2D ultrasound image for registration purpose and the 3D medical image.

According to the embodiment, based on the predefined image evaluation parameter, the deriving function 161B of the 2D ultrasound image obtaining function 161 derives the image evaluation parameter for a plurality of 2D ultrasound images obtained by the obtaining function 161A. Then, based on the derivation results of the image evaluation parameter, the control function 161C selects, from among the plurality of 2D ultrasound images, the suitable 2D ultrasound images as the 2D ultrasound images for registration purpose. Thus, the 2D ultrasound images that are helpful in enhancing the accuracy of image registration can be retrieved in a short period of time.

Moreover, in the present embodiment, more than one 2D ultrasound images can be selected as the 2D ultrasound images for registration purpose. That is, when the control function 161C selects a plurality of 2D ultrasound images as the 2D ultrasound images for registration purpose, the registration function 163 performs image registration of the 2D ultrasound images selected by the control function 161C and the 3D medical image obtained by the 3D medical image obtaining function 162. In that case, the accuracy of image registration can be further enhanced.

Furthermore, in the embodiment, the deriving function 161B derives the image evaluation parameter for a plurality of 2D ultrasound images; either displays the 2D ultrasound images and the respective derivative results of the image evaluation parameter in the display 103, or displays the suitable 2D ultrasound images (the 2D ultrasound images having high image registration accuracy) in a highlighted manner in the display 103, so as to present the 2D ultrasound images to the operator and to let the operator confirm the 2D ultrasound images. That enables the operator to easily select the 2D ultrasound image that is suitable for image registration.

Moreover, in the embodiment, based on the derivation results of the image evaluation parameter, the deriving function 161B can automatically select the suitable 2D ultrasound images as the 2D ultrasound images for registration purpose, without presenting the suitable 2D ultrasound images to the operator. In that case, since the confirmation by the operator is not required, image registration can be completed in a shorter period of time.

The detailed explanation about the image evaluation parameter according to the embodiment is given below with reference to examples. The image evaluation parameter according to the embodiment can be at least one of a landmark, a texture metric, an orthogonality metric, coverage, and a Doppler blood flow image.

Landmark

Figure 6A:
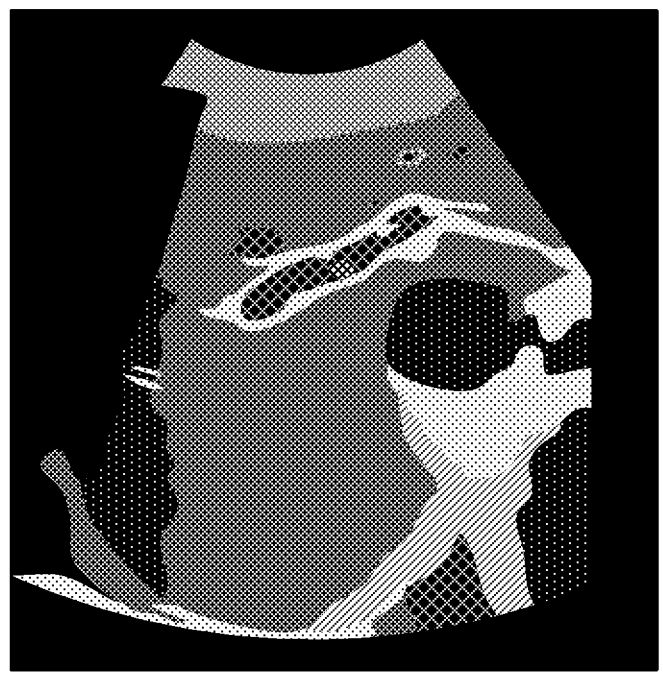
FIGS. 6A and 6B are diagrams illustrating 2D ultrasound images in which landmarks are included.
Figure 6B:
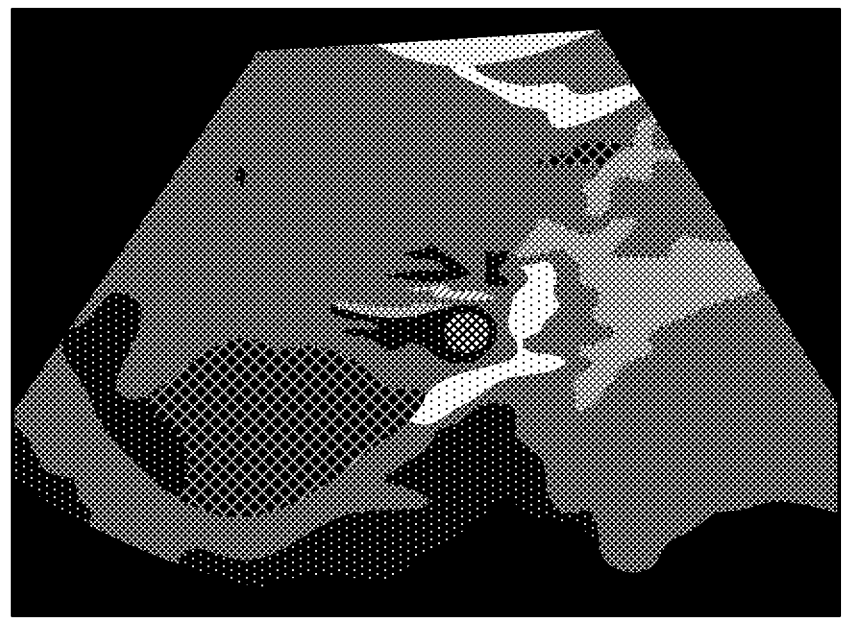

A landmark is a body part having anatomically distinctive features, and represents the key point as far as performing a surgery is concerned. For example, when the liver represents the target organ for treatment, examples of the landmark include a convergence region of the portal vein or the hepatic vein, and a region of origin of the portal vein or the hepatic vein. FIGS. 6A and 6B are diagrams illustrating 2D ultrasound images in which landmarks are included. In the examples illustrated in FIGS. 6A and 6B, the convergence regions of the portal vein or the hepatic vein in the liver are illustrated using dots. In medical images having different modes, the landmarks can be detected according to a detection algorithm such as a deep neural network.

The control function 161C selects 2D ultrasound images in which a landmark is included as the 2D ultrasound images for registration purpose. The registration function 163 detects the landmark from the 2D ultrasound images for registration purpose and from a 3D medical image, and performs image registration of the 2D ultrasound images and the 3D medical image using the detected landmark. As a result, it becomes possible to enhance the accuracy of image registration. In this way, in the embodiment, as a result of using a landmark as the image evaluation parameter, it becomes possible to obtain the 2D ultrasound images suitable for image registration with a 3D medical image.

Herein, in the case of extracting an anatomically distinctive feature, for example, grey scale, a feature descriptor, or a neural network is used.

In the case of using grey scale, a histogram is created by detecting the extreme values from the difference image of smoothed images obtained using filters having difference scales, and the feature quantity is extracted from the changes in the grey scale in either a local region or the entire region of the image expressed by the histogram.

In the case of using a feature descriptor, by calculating the differences in images according to different scales, a robust feature quantity is extracted with respect to the magnification/reduction of images and the parallel shift or rotation of images. The feature description can be expressed as a vector. The commonly-used feature descriptors include corner detection of Harris, scale-invariant feature transform (SIFT), and speeded-up robust features (SURF).

In the case of using a neural network, an image is input to the neural network and the feature quantity is extracted by directly obtaining the coordinates of the feature points. Examples of the neural network include a convolutional neural network (CNN) such as the Hourglass network, the UNet that is a U-shaped neural network, or the nnUNet; and a recursive neural network such as the long short-term memory (LSTM), the recurrent neural network (RNN) that is a simplified model of the LSTM, or a gated recurrent unit (GRU). However, the neural network is not limited to those examples.

Texture Metric

For example, in a 2D ultrasound image, when a body part distinguishable by an anatomical name such as a "portal vein" or a "region of origin of the portal vein"; as explained earlier, the landmark is used as the image evaluation parameter. On the other hand, in a 2D ultrasound image, regarding a body part that is not distinguishable by an anatomical name; for example, the texture metric is used as the image evaluation parameter.

Figure 7A:
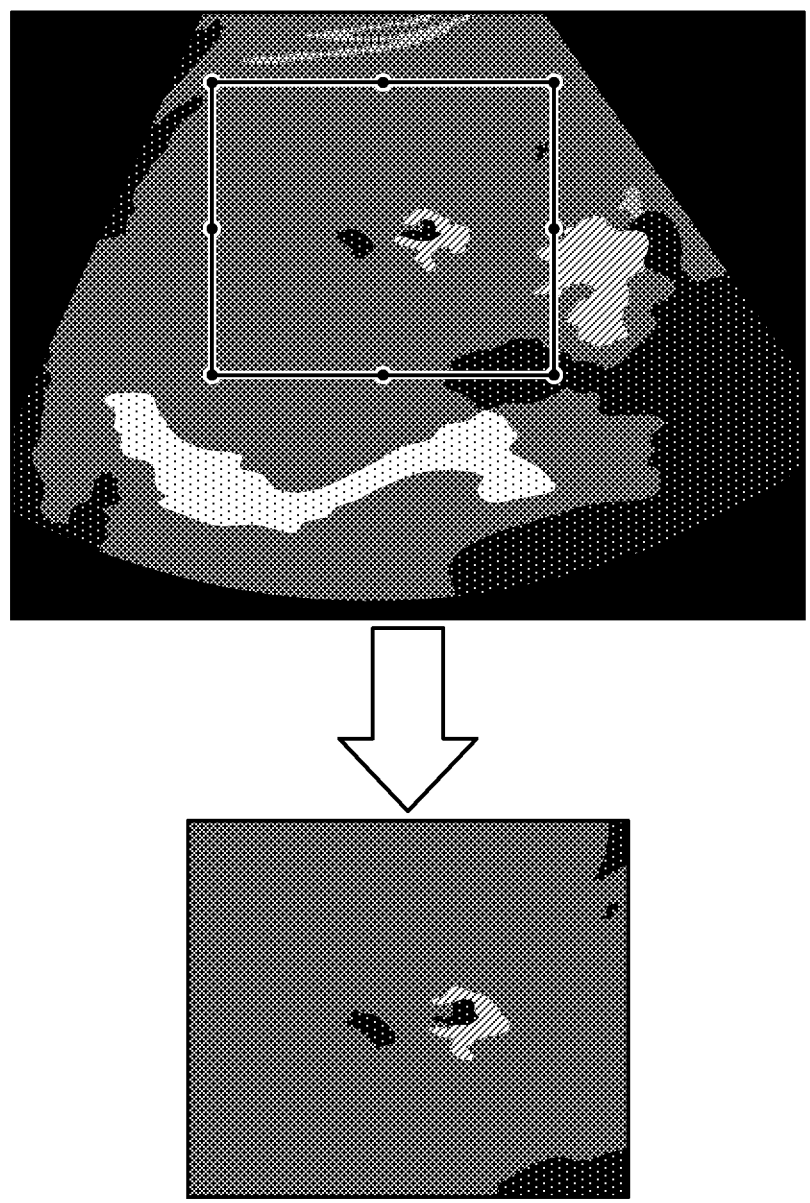

FIGS. 7A and 7B are diagrams illustrating 2D ultrasound images having different texture structures. The texture metric represents the number of texture structures in an ultrasound image. If the texture structures are more tangible, it becomes possible to achieve further enhancement in the accuracy of image registration. For example, the 2D ultrasound image illustrated in FIG. 7B has a greater number of texture structures than the 2D ultrasound image illustrated in FIG. 7A. In that case, it is desirable that the 2D ultrasound image illustrated in FIG. 7B is selected as the 2D ultrasound image for registration purpose.

In order to determine the number of texture structures, the derivation can be performed using the standard deviation. For example, the central region of the ultrasound image is selected and a standard deviation SD of that region is obtained using Equation 1 given below.

$$SD = \sqrt{\frac{\sum_N (I_j - \bar{I})}{N - 1}} \quad (1)$$

In Equation 1, Ij represents the pixel intensity, the over-lined I represents the average pixel intensity, and N represents the pixel count. After the standard deviation of each region is obtained, it is normalized in the interval [0, 1].

As a result, the operator becomes able to select the scanning surface (i.e., the 2D ultrasound image) in which the normalized value of the texture metric is closest to "1". For example, the control function 161C displays, in the display 103, a plurality of 2D ultrasound images in which the normalized value of the texture metric is included, and presents the 2D ultrasound images to the operator. Then, the control function 161C treats the operator-selected 2D ultrasound image as the 2D ultrasound image for registration purpose. In this way, in the embodiment, as a result of using the texture metric as the image evaluation parameter, the 2D ultrasound image having the highest count of texture structures can be obtained as the 2D ultrasound image for registration purpose.

Meanwhile, in the examples given above, the standard deviation of the luminosity of a 2D ultrasound image is used as the texture metric representing an example of the image evaluation parameter. However, that is not the only possible example. Alternatively, the texture metric representing an example of the image evaluation parameter can be set based on at least either the luminance gradient or the luminance difference in a 2D ultrasound image. In each ultrasound image, the standard deviation, the luminance gradient, or the luminance difference used as the texture metric can be obtained in the entire image or can be obtained only in some region (such as the central region). The parameter such as the standard deviation, the luminance gradient, or the luminance difference representing the texture metric is eventually a parameter indicating the boundary or the contour of the organ, and the operation of obtaining that parameter is equivalent to the operation of generating an edge-reinforced image from the source image.

Orthogonality Metric

In the case of performing registration using a plurality of 2D ultrasound images, it is desirable to be able to select a plurality of 2D ultrasound images having large differences in the scanning direction, in other words, having the scanning directions to be orthogonally closer. That is because, in the case of maintaining the scanning direction, if the scanning is performed by the parallel shift of the probe, the difference in the internal texture structures may not be clear; and, if scanning is performed in different directions, a greater variety of texture structures can be observed.

In order to determine the orthogonality among the scanning surfaces, an orthogonality metric is used. An orthogonality metric Orth can be derived using Equation 2 given below.

$$Orth = 1 - \frac{1}{N}\sum_{i \in N} \frac{N' \cdot N_i}{|N'| \cdot |N_i|} \quad (2)$$

In Equation 2, i represents the i-th selected 2D ultrasound image; $N_i$ represents the orthogonal component of the i-th selected 2D ultrasound image; N represents the number of 2D ultrasound images; and N' represents the orthogonal component of the current 2D ultrasound image. It is desirable that the 2D ultrasound images having a large orthogonality metric Orth are selected as far as possible.

Figure 8:
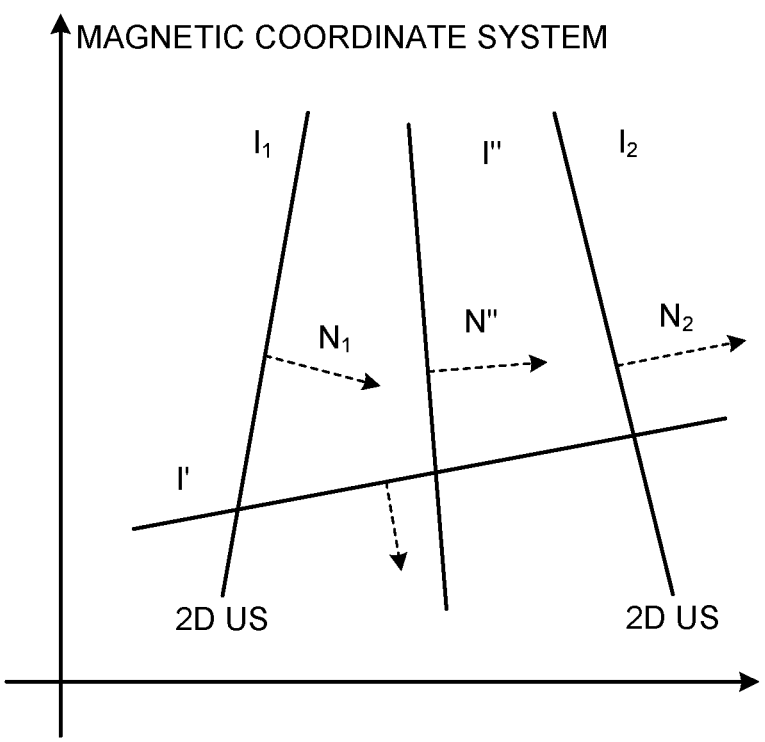
FIG. 8 is a diagram for explaining a method for determining the orthogonality metric.

The following explanation is given with reference to FIG. 8. As illustrated in FIG. 8, each scanning surface is converted into a magnetic coordinate system. For example, the magnetic coordinate system is obtained from the magnetic sensor attached to the ultrasound probe 101. In FIG. 8, 2D ultrasound images are written as "2D US". Moreover, I1, I2, I', and I" represent a plurality of scanning surfaces (i.e., 2D ultrasound images) having different scanning directions. Herein, I1 and I2 represent the selected 2D ultrasound images; and N1 and N2 represent the orthogonal components of the selected 2D ultrasound images I1 and I2, respectively. Since the result of comparison between the scanning surfaces I' and I" indicates that the degree of orthogonality between the scanning surface I' and the selected 2D ultrasound images I1 and I2 is high, it is desirable that the 2D ultrasound image I' is selected instead of the 2D ultrasound image I" as the 2D ultrasound image for registration purpose.

After obtaining the orthogonality metric Orth, it is normalized in the interval [0, 1].

As a result, the operator becomes able to select the scanning surface having the normalized value of the orthogonality metric to be closest to "1". For example, the control function 161C displays, in the display 103, a plurality of 2D ultrasound images each including the normalized value of the orthogonal metric, and presents the 2D ultrasound images to the operator. Then, the control function 161C treats the operator-selected 2D ultrasound image as the 2D ultrasound image for registration purpose. In this way, in the embodiment, as a result of using the orthogonality metric as the image evaluation parameter, it becomes possible to obtain 2D ultrasound images having orthogonally closer scanning directions.

Coverage

The 2D ultrasound image for registration purpose needs to cover a large region of interest (ROI) to the extent possible. The region of interest is the region that the operator particularly wishes to observe. For example, in liver ablation, the region of interest implies the entire liver. The coverage represents the size of the common region between a closed region formed in the three-dimensional space by a plurality of 2D ultrasound images and the region of interest. Thus, it is desirable that a plurality of 2D ultrasound images that forms the closed region in the three-dimensional space to account for a large portion of the entire region of interest is treated as the 2D ultrasound images for registration purpose.

Figure 9A:
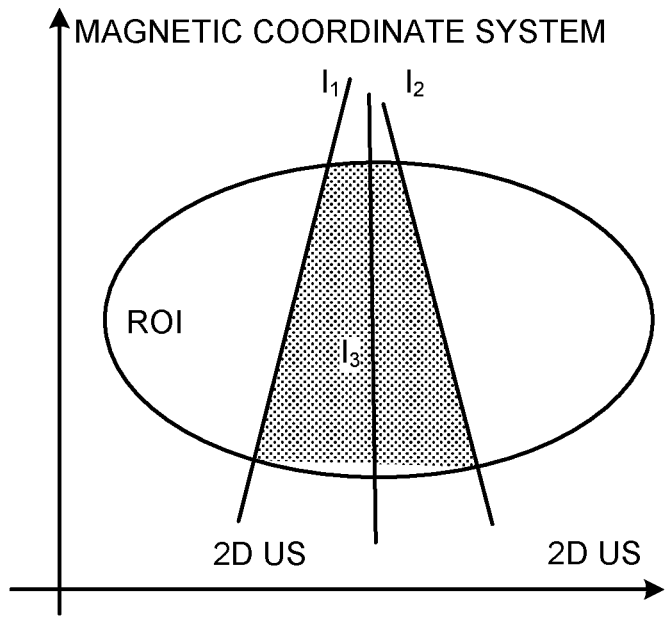
FIGS. 9A and 9B are diagrams for explaining a method for determining the coverage.
Figure 9B:
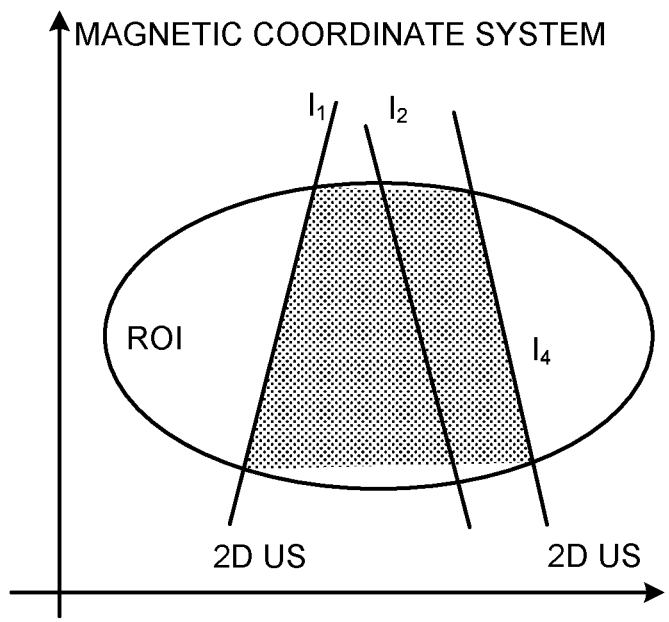

Explained below with reference to FIGS. 9A and 9B is the method for determining the coverage. With reference to FIGS. 9A and 9B, each scanning surface is converted into the magnetic coordinate system. For example, the magnetic coordinates are obtained from the magnetic sensor attached to the ultrasound probe 101. In FIGS. 9A and 9B, the 2D ultrasound images are written as "2D US", and the region of interest is written as "ROI". The abovementioned closed region represents the region identified by connecting the points of intersection at which the outside scanning surfaces and the region of interest intersect in the magnetic coordinate system. Herein, I1, I2, and I3 illustrated in FIG. 9A and I1, I2, and I4 illustrated in FIG. 9B represent the scanning surfaces having different scanning directions. Moreover, in FIGS. 9A and 9B, I1 and I2 represent the selected 2D ultrasound images, and I3 and I4 represent the candidate 2D ultrasound images for selection. Furthermore, in FIGS. 9A and 9B, the mesh pattern represents the common region between the closed region formed in the three-dimensional space by the 2D ultrasound images and the region of interest. The size of the common region formed by the scanning surfaces I1, I2, and I4 illustrated in FIG. 9B and the region of interest ROI is greater than the size of the common area formed by the scanning surfaces I1, I2, and I3 illustrated in FIG. 9A and the region of interest ROI. Thus, it is desirable that the scanning surface I4 is selected without selecting the scanning surface I3.

The size of coverage can be obtained in an identical manner according to a detection algorithm. Moreover, after the coverage of each scanning surface with respect to the region of interest is obtained, the coverage can be normalized in the interval [0, 1].

As a result, the operator becomes able to select the scanning surface having the normalized value of the coverage to be closest to "1". For example, the control function 161C displays, in the display 103, a plurality of 2D ultrasound images each including the normalized value of the coverage, and presents the 2D ultrasound images to the operator. Then, the control function 161C treats the operator-selected 2D ultrasound image as the 2D ultrasound image for registration purpose. In this way, in the embodiment, as a result of using the coverage as the image evaluation parameter, a plurality of 2D ultrasound images covering a larger region of interest can be obtained.

Doppler Blood Flow Image

In a human body, all major blood vessels generally have tangible structural features; and, more tangible the structural features, the more effective becomes the image registration. Thus, by using Doppler blood flow images as the 2D ultrasound images, it becomes possible to easily observe whether or not blood flow information is included in the 2D ultrasound images.

Hence, the operator becomes able to select the 2D ultrasound image in which blood flow information is included. For example, the control function 161C displays, in the display 103, a plurality of 2D ultrasound images each including blood flow information, and presents the 2D ultrasound images to the operator. Then, the control function 161C treats the operator-selected 2D ultrasound image as the 2D ultrasound image for registration. In this way, in the embodiment, as a result of using the Doppler blood flow image as the image evaluation parameter, image registration can be performed with ease and the accuracy of image registration can be enhanced.

In the embodiment, examples of the image evaluation parameter include a landmark, a texture metric, an orthogonality metric, coverage, and a Doppler blood flow image. However, the image evaluation parameter is not limited to those examples.

If the 2D ultrasound image for registration purpose is selected using only one of the image evaluation parameters, then the control function 161C displays, on that 2D ultrasound image, the information indicating the used image evaluation parameter. For example, when only the landmark is used as the image evaluation parameter, the control function 161C displays, on the 2D ultrasound image, the term "landmark" as the information indicating the used image evaluation parameter. Alternatively, if the 2D ultrasound image for registration purpose is selected using a plurality of image evaluation parameters, then the control function 161C displays, on the 2D ultrasound image, the information indicating the used image evaluation parameters. For example, if weight coefficients are assigned to a plurality of image evaluation parameters and if the landmark, the texture metric, and the orthogonality metric are used as the image evaluation parameters; then the control function 161C displays, on the 2D ultrasound image, information "landmark: 1; texture metric: 0.7; orthogonality metric: 0.5" as the information indicating the used image evaluation parameters.

Herein, "1", "0.7", and "0.5" represent the weight coefficients assigned to the "landmark", the "texture metric", and the "orthogonality metric", respectively. More particularly, when a plurality of image evaluation parameters is used; for example, the operator assigns different weight coefficients (weights) to the image evaluation parameters based on, for example, the type of surgery and the body part of interest. Then, based on the weighting coefficients assigned to the image evaluation parameters, the control function 161C calculates weighting scores and selects the 2D ultrasound image for registration purpose based on the weighting scores.

The calculation formula for calculating a weighting score Sk of each 2D ultrasound image is given below in Equation 3.

$$S_k = \sum_{i=1}^{N} W_i M_i \quad (3)$$

In Equation 3, Mi represents the evaluation parameter of the i-th 2D ultrasound image; Wi represents the weight of the i-th 2D ultrasound image; and N represents the number of image evaluation parameters. The control function 161C calculates the total weighting score according to the weighting calculation method, and selects the 2D ultrasound image for registration purpose based on the calculated weighting score. In that case, the control function 161C can display, on the 2D ultrasound image, information indicating the final weighting score as the information indicating the used image evaluation parameters. For example, the control function 161C can display, on the 2D ultrasound image, only "weighting score: 0.75" as the information indicating the final weighting score. Herein, it is more preferable to have the weighting score closer to "1".

As a result, based on the weighting coefficients assigned to the image evaluation parameters, the control function 161C calculates the weighting score; evaluates the 2D ultrasound images in a more comprehensive manner; and selects the 2D ultrasound image for registration purpose based on the evaluation result. In this way, in the embodiment, as a result of assigning the weighting coefficients to a plurality of image evaluation parameters, it becomes possible to select the 2D ultrasound image that is more suitable for image registration.

First Specific Example

Herein, as a specific example of image registration, the explanation is given about the image registration performed when landmarks are used.

In this case, the registration function 163 detects the landmarks from a plurality of 2D ultrasound images for registration purpose and a 3D medical image. As a result of using the landmarks, registration of the 2D ultrasound images and the 3D medical image can be performed with ease.

FIG. 10 is a diagram for explaining the image registration performed using landmarks. Herein, I1, I2, I3 represent 2D ultrasound images; P1, P2, and P3 represent the landmarks in the 2D ultrasound images; and Q1, Q2, and Q3 represent the landmarks in a 3D medical image. As illustrated in the upper part in FIG. 10, the registration function 163 implements a detection algorithm and detects the landmarks P1, P2, P3 in the 2D ultrasound images and detects the landmarks Q1, Q2, and Q3 in the 3D medical image. Then, the registration function 163 performs matching of the landmarks P1, P2, P3 with the landmarks Q1, Q2, and Q3; and obtains dot-pairs <Pi, Qi> of corresponding landmarks. Then, using the dot-pairs <Pi, Qi>, the registration function 163 generates conversion parameters indicating the correspondence relationship of the landmarks Q1, Q2, and Q3 in the 3D medical image with the landmarks P1, P2, and P3 in the 2D ultrasound images. Subsequently, based on the conversion parameters, the registration function 163 performs image registration of each 2D ultrasound image and the 3D medical image. Herein, i represents the number of dot-pairs and is an integer equal to or greater than one. In the example given above, i=3 holds true.

Figure 11:
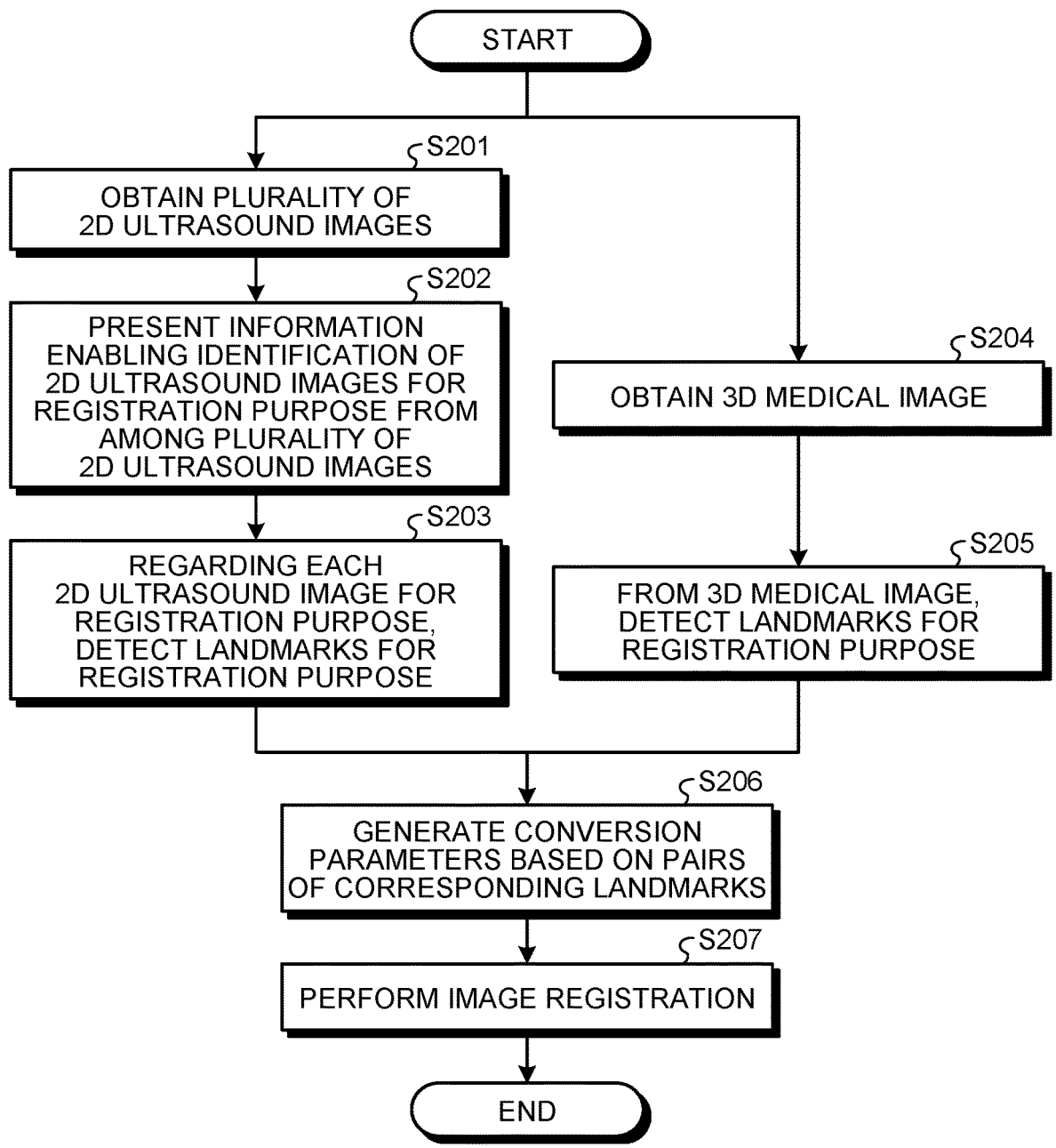
FIG. 11 is a flowchart illustrating a specific example of image registration, and is meant for explaining the image registration performed using landmarks.

FIG. 11 is a flowchart for explaining the image registration performed using landmarks. Thus, explained below with reference to FIG. 11 is the image registration of the 2D ultrasound images and the 3D medical image illustrated in the first specific example.

As illustrated in FIG. 11, firstly, at Step S201, the identical operation to the operation at Step S101 explained earlier is performed. That is, the obtaining function 161A of the 2D ultrasound image obtaining function 161 obtains, from the image generating circuitry 130, a plurality of 2D ultrasound images, which is transmitted via the ultrasound probe 101 and processed, as the ultrasound images of the subject P obtained as a result of performing ultrasound scanning with respect to the subject P.

Then, at Step S202, either the operations equivalent to Steps S102 and S103A explained earlier are performed, or the operations equivalent to Steps S102 and S104A explained earlier are performed. That is, based on the preidentified image evaluation parameter, the deriving function 161B of the 2D ultrasound image obtaining function 161 calculates the image evaluation parameter for a plurality of 2D ultrasound images obtained by the obtaining function 161A, and obtains numerical values representing the derivation results of the image evaluation parameter. Then, the control function 161C displays, in the display 103, the information enabling identification of the 2D ultrasound images for registration purpose, and presents that information to the operator. The information contains the derivation results of the image evaluation parameter, along with either the 2D ultrasound images or the highlighted 2D ultrasound images. For example, the control function 161C displays, in the display 103, a plurality of 2D ultrasound images each including the numerical value representing the derivation result of the image evaluation parameter, and presents the 2D ultrasound images to the operator. For example, based on the derivation results of the image evaluation parameter, the control function 161C determines whether or not the plurality of 2D ultrasound images are suitable for image registration with a 3D medical image, and presents the suitable 2D ultrasound images to the operator by displaying them in a highlighted manner in the display 103. At that time, the control function 161C treats the operator-selected 2D ultrasound image as the 2D ultrasound image for registration purpose, and outputs it to the registration function 163.

Meanwhile, the operations equivalent to Steps S102 and S105A explained earlier can also be performed. That is, based on the preidentified image evaluation parameter, the deriving function 161B of the 2D ultrasound image obtaining function 161 derives the image evaluation parameter for a plurality of 2D ultrasound images obtained by the obtaining function 161A, and obtains numerical values representing the derivation results of the image evaluation parameter. Then, based on the derivation results of the image evaluation parameter, the control function 161C selects, from among a plurality of 2D ultrasound images, the 2D ultrasound images suitable for image registration with a 3D medical image as the 2D ultrasound images for registration purpose, and outputs those 2D ultrasound images to the registration function 163.

Then, at Step S203, regarding each 2D ultrasound image for registration purpose as output from the control function 161C, the registration function 163 detects the landmarks for registration purpose.

Meanwhile, at Step S204, the 3D medical image obtaining function 162 obtains a 3D medical image generated by a medical image diagnostic device, and outputs it to the registration function 163. Then, at Step S205, for the 3D medical image output from the control function 161C, the registration function 163 detects landmarks for registration purpose. Herein, the detection of landmarks for the 2D ultrasound images and the detection of the landmarks for the 3D medical image can be performed in parallel or in a chronological manner. That is, there is no restriction on the timings for detecting the landmarks. When the detection of landmarks for the 2D ultrasound images and the detection of the landmarks for the 3D medical image is performed in a chronological manner; for example, the display control function 164 displays the landmarks in the 3D medical image in a highlighted manner in the display 103, so that the operator can operate the ultrasound probe 101 while referring to the landmarks in the displayed 3D medical image. As a result, the operations at Steps S201 to S203 explained above are implemented.

Subsequently, at Step S206, the registration function 163 performs matching of the landmarks P1, P2, P3 in the 2D ultrasound images with the landmarks Q1, Q2, and Q3, respectively, in the 3D medical image, and obtains the dot-pairs <Pi, Qi> of corresponding landmarks. Then, using the dot-pairs <Pi, Qi>, the registration function 163 generates conversion parameters indicating the correspondence relationship of the landmarks Q1, Q2, and Q3 in the 3D medical image with the landmarks P1, P2, and P3 in the 2D ultrasound images. Subsequently, at Step S207, based on the conversion parameters, the registration function 163 performs image registration of each 2D ultrasound image and the 3D medical image.

According to the first specific example, the image registration of the 2D ultrasound images and a 3D medical image can be performed with ease; the time required for image registration can be shortened; and the accuracy of image registration can be enhanced. That enables achieving reduction in the physical stress exerted on the patient while undergoing surgery.

Second Specific Example

Figure 12A:
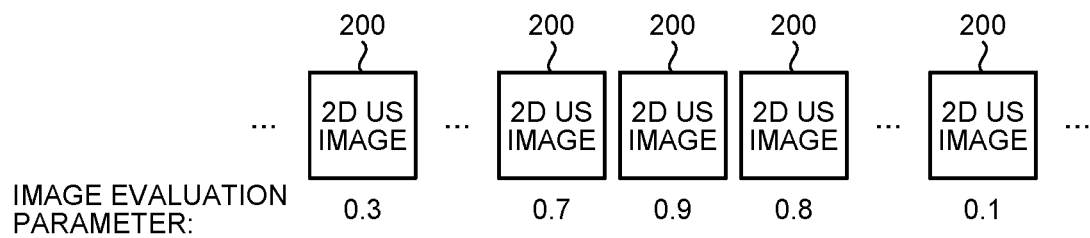
FIGS. 12A and 12B are diagrams illustrating specific examples of the case in which a plurality of 2D ultrasound images is selected as 2D ultrasound images for registration purpose.
Figure 12B:
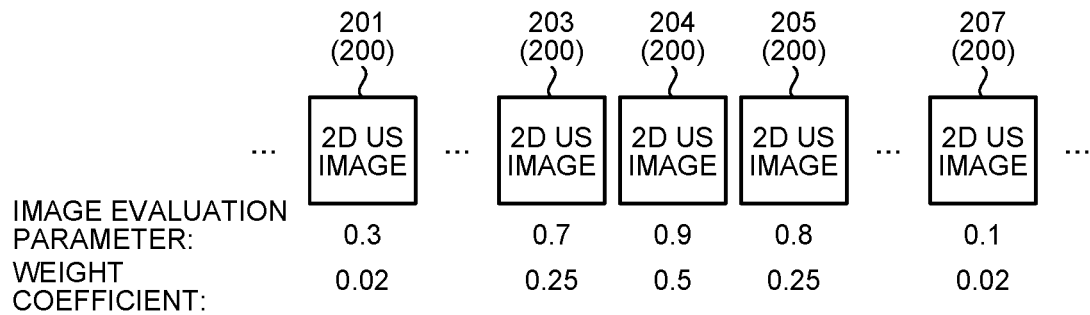

The following explanation is given about specific examples in which, when the texture metric is used as the image evaluation parameter, the texture metric is set based on the luminance gradient from among the luminance gradient and the luminance difference in a plurality of 2D ultrasound images. In FIGS. 12A and 12B are explained specific examples of the case in which a plurality of 2D ultrasound images is selected as the 2D ultrasound images for registration purpose. In FIGS. 12A and 12B, "2D US image" represents a 2D ultrasound image.

For example, when the operator performs ultrasound scanning with respect to the subject P, the obtaining function 161A obtains a plurality of 2D ultrasound images. At that time, the deriving function 161B derives the image evaluation parameter for the 2D ultrasound images obtained by the obtaining function 161A. More particularly, when the 2D ultrasound images have large luminance gradients, the deriving function 161B sets the derivation results of the image evaluation parameter of the 2D ultrasound images having large luminance gradients to large values, and sets the derivation results of the image evaluation parameter of the 2D ultrasound images having small luminance gradients to small values.

As explained earlier, a derivation result is expressed as a normalized numerical value that is normalized in the interval [0, 1]. As illustrated in FIG. 12A, for example, the deriving function 161B treats the 2D ultrasound image 200 having the largest luminance gradient as the reference 2D ultrasound image, and sets the numerical value "0.9" with respect to the derivation result of the image evaluation parameter of the reference 2D ultrasound image. Moreover, with respect to the derivation results of the image evaluation parameter of the 2D ultrasound images 200 other than the reference 2D ultrasound image, the deriving function 161B sets smaller numerical values than the numerical value "0.9". More particularly, regarding the derivation results of the image evaluation parameter of the 2D ultrasound images 200 other than the reference 2D ultrasound image; farther the 2D ultrasound image 200 is from the reference 2D ultrasound image, the smaller is the value set with respect to the derivation result of the image evaluation parameter. In the example illustrated in FIG. 12A, with respect to the derivation results of the image evaluation parameter of the 2D ultrasound images 200 present immediately before and immediately after the reference 2D ultrasound image, numerical values "0.7" and "0.8" are respectively set. Similarly, with respect to the derivation results of the image evaluation parameter of the 2D ultrasound images 200 separated by three images before and three images after the reference 2D ultrasound image, numerical values "0.3" and "0.1" are respectively set. In the case of displaying the derivation results in color in the display 103, as explained earlier, the control function 161C displays the derivation results in red, yellow, and green colors that are assigned to three intervals "0 to 0.6", "0.6 to 0.85", and "0.85 to 0.1", respectively.

A plurality of 2D ultrasound images obtained as a result of performing ultrasound scanning represents image data arranged along the direction of a particular axis. Hence, as a plurality of 2D ultrasound images, the control function 161C selects the reference 2D ultrasound image that is the 2D ultrasound image 200 having the largest luminance gradient, and selects a predetermined number of 2D ultrasound images arranged before and after the reference 2D ultrasound image. For example, the selected 2D ultrasound images indicates an odd number of 2D ultrasound images equal to or greater than three. In the example illustrated in FIG. 12B, if the predetermined count is set to three, the control function 161C selects seven 2D ultrasound images as a plurality of 2D ultrasound images 201 to 207. From among the first to seventh 2D ultrasound images 201 to 207, the fourth ultrasound image 204 represents the reference 2D ultrasound image having the largest luminance gradient.

The control function 161C assigns weighting coefficients (weights) to the derivation results of the image evaluation parameter of the 2D ultrasound images 201 to 207 and, based on the derivation results of the image evaluation parameter and based on the weighting coefficients, derives the image evaluation parameter of all of the 2D ultrasound images 201 to 207. As illustrated in FIG. 12B, for example, the control function 161C assigns "0.5" as the weighting coefficient to the derivation result "0.9" of the image evaluation parameter of the 2D ultrasound image 204 representing the reference 2D ultrasound image, and assigns weighting coefficients smaller than the weighting coefficient "0.5" to the derivation results of the image evaluation parameter of the 2D ultrasound images 201, 202, 203, 205, 206, and 207 other than the 2D ultrasound images 204. More particularly, regarding the derivation results of the image evaluation parameter of the 2D ultrasound images 201, 202, 203, 205, 206, and 207; farther the 2D ultrasound image 200 is from the 2D ultrasound image 204, the smaller is the weighting coefficient. In the example illustrated in FIG. 12B, with respect to the derivation results of the image evaluation parameter of the 2D ultrasound images 203 and 205, a weighting coefficient "0.25" is set. Moreover, with respect to the derivation results of the image evaluation parameter of the 2D ultrasound images 201 and 207, a weighting coefficient "0.02" is set.

The calculation formula for calculating an overall image evaluation parameter Qvol is given below in Equation 4.

$$Q_{vol} = \sum_{i=1}^{N} W_i Q_i \quad (4)$$

In Equation 4, Qi represents the image evaluation parameter of the i-th 2D ultrasound image; Wi represents the weight of the i-th 2D ultrasound image; and N represents the number of 2D ultrasound images. Based on the derivation result of the overall image evaluation parameter, the control function 161C either selects the 2D ultrasound image 204 representing the reference 2D ultrasound image as the 2D ultrasound image for registration purpose or selects the 2D ultrasound images 201 to 207 as the 2D ultrasound images for registration purpose. In the example illustrated in FIG. 12B, when the control function 161C calculates the overall image evaluation parameter Qvol using Equation 4, the calculated overall image evaluation parameter Qvol becomes equal to, for example, "0.875". If the overall image evaluation parameter Qvol is equal to or greater than a setting image evaluation parameter that is set in advance, then the control function 161C selects the 2D ultrasound images 201 to 207 as the 2D ultrasound images for registration purpose. For example, if the setting image evaluation parameter set in advance for the liver is equal to "0.8"; since the overall image evaluation parameter Qvol is greater than the setting screen evaluation parameter, the control function 161C selects the 2D ultrasound images 201 to 207 as the 2D ultrasound images for registration purpose. On the other hand, if the overall image evaluation parameter Qvol is smaller than the setting image evaluation parameter, then the control function 161C selects only the 2D ultrasound image 204 representing the reference 2D ultrasound image as the 2D ultrasound image for registration purpose.

If the 2D ultrasound images 201 to 207 are selected as the 2D ultrasound images for registration purpose, then the registration function 163 reconstructs the 3D medical image (the volume data) based on the 2D ultrasound images 201 to 207 and performs image registration of the reconstructed 3D medical image and the 3D medical image obtained by the 3D medical image obtaining function 162.

In this way, in the second specific example too, the image registration of 2D ultrasound images and a 3D medical image can be performed with ease; the time required for image registration can be shortened; and the accuracy of image registration can be enhanced. That enables achieving reduction in the physical stress exerted on the patient while undergoing surgery. In the second specific example, the explanation is given about the case of using the texture metric. Alternatively, the registration function 163 can detect landmarks from the 2D ultrasound images for registration purpose and the 3D medical image obtained by the 3D medical image obtaining function 162, and can perform image registration of the 2D ultrasound image for registration purpose and the 3D medical image using the detected landmarks.

OTHER EMBODIMENTS

The embodiment is not limited to the details explained above. For example, the processing circuitry 160 can be a workstation separately installed from the ultrasound diagnostic apparatus 1. In that case, the workstation functions as a medical image processing apparatus, includes processing circuitry identical to the processing circuitry 160, and performs the operations explained above.

Meanwhile, the constituent elements of the device illustrated in the drawings are merely conceptual, and need not be physically configured as illustrated. The constituent elements, as a whole or in part, can be separated or integrated either functionally or physically based on various types of loads or use conditions. Moreover, the process functions performed by the device are entirely or partially implemented by the CPU or computer programs that are analyzed and executed by the CPU, or implemented as hardware by wired logic.

The processing method (the medical image processing method) explained above in the embodiment can be implemented when a computer program written in advance is executed in a computer such as a personal computer or a workstation. The computer program can be distributed via a network such as the Internet. Alternatively, the computer program can be recorded in a non-transitory computer-readable recording medium such as a hard disc (HDD), a flexible disc (FD), a compact disc read only memory (CD-ROM), a magneto-optical disc (MO), or a digital versatile disc (DVD); and a computer can read the computer program from the recording medium and execute it.

According to at least one of the embodiments described above, ultrasound images that make image registration easier can be retrieved in a short period of time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ultrasound diagnostic apparatus, comprising:
   processing circuitry configured to:
   derive a predefined image evaluation parameter with respect to a plurality of two-dimensional ultrasound images obtained by an ultrasound probe;
   select a two-dimensional ultrasound image for registration purposes from among the plurality of two-dimensional ultrasound images, based on derivation results of the image evaluation parameter; and
   perform image registration of a three-dimensional medical image and the two-dimensional ultrasound image for registration purposes,
   wherein, as the image evaluation parameter, at least one of a landmark, a texture metric, an orthogonality metric, a coverage, or a Doppler blood flow image is used.

2. The ultrasound diagnostic apparatus according to claim 1, wherein
   the processing circuitry is further configured to detect a landmark from the two-dimensional ultrasound image for registration purposes and from the three-dimensional medical image, and
   based on a landmark in the three-dimensional medical image and based on the corresponding landmark in the two-dimensional ultrasound image for registration purposes, the processing circuitry is further configured to perform the image registration.

3. The ultrasound diagnostic apparatus according to claim 1, wherein the processing circuitry is further configured to display the derivation results along with the two-dimensional ultrasound images on a display.

4. The ultrasound diagnostic apparatus according to claim 3, wherein the processing circuitry is further configured to display the derivation results in different forms according to degrees of recommendation.

5. The ultrasound diagnostic apparatus according to claim 1, wherein the processing circuitry is further configured to display, in a highlighted manner, a particular two-dimensional ultrasound image for which the derivation result exceeds a predetermined threshold value.

6. The ultrasound diagnostic apparatus according to claim 1, wherein the processing circuitry is further configured to automatically select, as the two-dimensional ultrasound image for registration purposes, a particular two-dimensional ultrasound image for which the derivation result exceeds a predetermined threshold value.

7. The ultrasound diagnostic apparatus according to claim 1, wherein, when the texture metric is used as the image evaluation parameter, the processing circuitry is further configured to select the two-dimensional ultrasound image including a greater number of texture structures as the two-dimensional ultrasound image for registration purposes.

8. The ultrasound diagnostic apparatus according to claim 1, wherein, when the orthogonality metric is used as the image evaluation parameter, the processing circuitry is further configured to select particular two-dimensional ultrasound images, from among the plurality of two-dimensional ultrasound images, having scanning directions orthogonally closer, as the two-dimensional ultrasound images for registration purposes.

9. The ultrasound diagnostic apparatus according to claim 1, wherein, when the coverage is used as the image evaluation parameter, the processing circuitry is further configured to select, as the two-dimensional ultrasound image for registration purposes from among the plurality of two-dimensional ultrasound images, a particular two-dimensional ultrasound image that forms a closed region in three-dimensional space to account for a large portion of entire region of interest.

10. The ultrasound diagnostic apparatus according to claim 1, wherein, when the Doppler image is used as the image evaluation parameter, the processing circuitry is further configured to select a particular two-dimensional ultrasound image including blood flow information as the two-dimensional ultrasound image for registration purpose.

11. The ultrasound diagnostic apparatus according to claim 1, wherein, when a plurality of image evaluation parameters is used, the processing circuitry is further configured to select the two-dimensional ultrasound image for registration purposes based on weighting coefficients assigned to the plurality of image evaluation parameters.

12. The ultrasound diagnostic apparatus according to claim 1, wherein the processing circuitry is further configured to display normalized numerical values as the derivation results.

13. The ultrasound diagnostic apparatus according to claim 1, wherein the three-dimensional medical image is either one of a three-dimensional ultrasound image, a three-dimensional computer tomography image, and a three-dimensional magnetic resonance image.

14. The ultrasound diagnostic apparatus according to claim 2, wherein the landmark represents a body part having anatomically distinctive features.

15. The ultrasound diagnostic apparatus according to claim 2, wherein
the processing circuitry is further configured to generate a conversion parameter indicating a correspondence relationship between a landmark in a three-dimensional medical image and corresponding landmark in a particular two-dimensional ultrasound image, and
the processing circuitry is further configured to perform the registration based on the conversion parameter.

16. The ultrasound diagnostic apparatus according to claim 1, wherein, the processing circuitry is further configured to select an additional two-dimensional ultrasound image, among the plurality of two-dimensional ultrasound images, for registration purposes, and the processing circuitry is further configured to perform the registration using the selected two-dimensional ultrasound images and the three-dimensional medical image.

17. The ultrasound diagnostic image according to claim 1, wherein the processing circuitry is further configured to select an additional two-dimensional ultrasound image, among the plurality of two-dimensional ultrasound images, for registration purposes, and
the processing circuitry is further configured to reconstruct a three-dimensional medical image based on the selected two-dimensional ultrasound images and perform the registration using the reconstructed three-dimensional medical image and the three-dimensional medical image.

18. The ultrasound diagnostic apparatus according to claim 17, wherein the processing circuitry is further configured to:
select, as the selected two-dimensional ultrasound images, a reference two-dimensional ultrasound image, which represents a particular two-dimensional ultrasound image having the image evaluation parameter to be largest, and a predetermined number of two-dimensional ultrasound images arranged before and after the reference two-dimensional ultrasound image,
with respect to the derivation results of the image evaluation parameter of the selected two-dimensional ultrasound images, assign weights in such a way that, farther a two-dimensional ultrasound image is from the reference two-dimensional ultrasound image, smaller is assigned weight,
derive an overall image evaluation parameter of the selected two-dimensional ultrasound images based on the derivation results and the weights, and
when the overall image evaluation parameter is equal to or greater than a setting image evaluation parameter, select the selected two-dimensional ultrasound images as the two-dimensional ultrasound images for registration purpose.

19. The ultrasound diagnostic apparatus according to claim 18, wherein, when a texture metric is used as the image evaluation parameter, the image evaluation parameter is based on at least one of a luminance gradient and a luminance difference in the selected two-dimensional ultrasound images.

20. A medical image processing apparatus, comprising:
processing circuitry configured to:
derive a predefined image evaluation parameter with respect to a plurality of two-dimensional ultrasound images obtained by an ultrasound probe;
select a two-dimensional ultrasound image for registration purposes from the plurality of two-dimensional ultrasound images, based on derivation results of the image evaluation parameter; and
perform image registration of a three-dimensional medical image and the two-dimensional ultrasound image for registration purposes,
wherein, as the image evaluation parameter, at least one of a landmark, a texture metric, an orthogonality metric, a coverage, or a Doppler blood flow image is used.

21. A medical image processing method, comprising:
deriving a predefined image evaluation parameter with respect to a plurality of two-dimensional ultrasound images obtained by an ultrasound probe;
selecting, based on derivation results of the image evaluation parameter, a two-dimensional ultrasound image for registration purposes from the plurality of two-dimensional ultrasound images; and
performing image registration of a three-dimensional medical image and the two-dimensional ultrasound image for registration purposes,
wherein, as the image evaluation parameter, at least one of a landmark, a texture metric, an orthogonality metric, a coverage, or a Doppler blood flow image is used.

* * * * *